United States Patent
Wintemute et al.

(10) Patent No.: US 10,694,655 B2
(45) Date of Patent: Jun. 30, 2020

(54) TAGGED CONTAINER TRACKING

(71) Applicant: AMVAC Chemical Corporation, Newport Beach, CA (US)

(72) Inventors: Eric G. Wintemute, Newport Beach, CA (US); Richard L. Rice, Collierville, TN (US); Kent James, Springfield, IL (US); John J. Richardson, Jacksonville, IL (US)

(73) Assignee: AMVAC Chemical Corporation, Newport Beach, CA (US)

( * ) Notice: Subject to any disclaimer, the term of this patent is extended or adjusted under 35 U.S.C. 154(b) by 199 days.

(21) Appl. No.: 15/981,289

(22) Filed: May 16, 2018

(65) Prior Publication Data

US 2018/0255696 A1   Sep. 13, 2018

Related U.S. Application Data

(63) Continuation-in-part of application No. 15/614,547, filed on Jun. 5, 2017, now Pat. No. 10,517,206, which
(Continued)

(51) Int. Cl.
*A01C 7/10* (2006.01)
*A01B 79/00* (2006.01)
(Continued)

(52) U.S. Cl.
CPC .............. *A01B 79/005* (2013.01); *A01C 7/10* (2013.01); *A01C 21/005* (2013.01);
(Continued)

(58) Field of Classification Search
None
See application file for complete search history.

(56) References Cited

U.S. PATENT DOCUMENTS 6,796,504 B2   9/2004 Robinson
6,938,564 B2   9/2005 Conrad
(Continued)

FOREIGN PATENT DOCUMENTS

AR      111815 A1    8/2019
GB      2417116      2/2006
(Continued)

OTHER PUBLICATIONS

International Search Report and Written Opinion dated Sep. 17, 2018, in connection with corresponding PCT Application No. PCT/US2018/032941 filed on May 16, 2018.
(Continued)

*Primary Examiner* — Paul Danneman
(74) *Attorney, Agent, or Firm* — Blueshift IP, LLC; Robert Plotkin

(57) ABSTRACT

A system and method that automatically monitors product use, such as the type and amount of agricultural and/or horticultural product stored in and dispensed from a cartridge over time and/or by geographic location. Monitored data are stored in memory such as a tag on the cartridge and may be transmitted to a server for storage, aggregation, and analysis. The cartridge may be authenticated before being authorized for use for the benefit of a current user in dispensing the product. The cartridge may be refilled after confirmation of authorization codes on the cartridge and refilling equipment tags. The cartridge may be calibrated automatically based on the bulk density or other parameter of the product in the cartridge. Data may be aggregated from a plurality of cartridges automatically. As-applied data from individual cartridges may be used to verify, independent of operator input, treated area coverage and product application rate.

30 Claims, 11 Drawing Sheets

Related U.S. Application Data is a continuation-in-part of application No. 14/521,908, filed on Oct. 23, 2014, now Pat. No. 9,820,431, which is a continuation-in-part of application No. 14/468,973, filed on Aug. 26, 2014, now abandoned.

(60) Provisional application No. 62/508,145, filed on May 18, 2017, provisional application No. 61/895,803, filed on Oct. 25, 2013, provisional application No. 62/346,377, filed on Jun. 6, 2016.

(51) Int. Cl.
| | | |
|---|---|---|
| *G06K 7/10* | (2006.01) | |
| *A01M 7/00* | (2006.01) | |
| *A01C 21/00* | (2006.01) | |
| *A01M 9/00* | (2006.01) | |
| A01C 23/00 | (2006.01) | |
| A01C 7/06 | (2006.01) | |

(52) U.S. Cl.
CPC ........ *A01M 7/0092* (2013.01); *A01M 9/0092* (2013.01); *G06K 7/10386* (2013.01); *A01C 7/06* (2013.01); *A01C 23/007* (2013.01)

(56) References Cited

U.S. PATENT DOCUMENTS

| | | |
|---|---|---|
| 6,963,881 B2 | 11/2005 | Pickett |
| 7,113,125 B2 | 9/2006 | Le Sesne |
| 7,142,124 B2 | 11/2006 | Chi |
| 7,225,167 B2 | 5/2007 | Hind |
| 7,270,065 B2 | 9/2007 | Conrad |
| 7,654,421 B2 | 2/2010 | Chan |
| 7,761,334 B2 | 7/2010 | Pickett |
| 7,900,819 B2 | 3/2011 | Silverbrook |
| 7,916,022 B2 | 3/2011 | Wilcox |
| 7,950,578 B2 | 5/2011 | Majer |
| 8,140,397 B2 | 3/2012 | Robinson |
| 8,284,056 B2 | 10/2012 | McTigue |
| 8,432,257 B2 | 4/2013 | Hind |
| 8,504,234 B2 | 8/2013 | Anderson |
| 8,505,488 B2 | 8/2013 | Pratt |
| 8,800,867 B2 | 8/2014 | Majer |
| 8,976,029 B1 | 3/2015 | McTigue |
| 9,051,163 B2 | 6/2015 | Mehus |
| 9,052,228 B2 | 6/2015 | Sollazzo Lee |
| 9,412,086 B2 | 8/2016 | Morse |
| 9,514,323 B2 | 12/2016 | Mehring |
| 9,550,662 B1 | 1/2017 | Brown |
| 9,569,748 B2 | 2/2017 | Peters, Jr. |
| 9,648,446 B2 | 5/2017 | Neves |
| 9,691,114 B2 | 6/2017 | Ashrafzadeh |
| 9,704,122 B2 | 7/2017 | Jung |
| 9,851,240 B2 | 12/2017 | Sollazzo Lee |
| 2005/0075899 A1 | 4/2005 | Corcoran |
| 2006/0004484 A1 | 1/2006 | Hornbaker |
| 2006/0271555 A1 | 11/2006 | Beck |
| 2006/0280181 A1 | 12/2006 | Brailas |
| 2007/0219916 A1 | 9/2007 | Lucas |
| 2008/0010172 A1 | 1/2008 | Magill |
| 2008/0157918 A1 | 7/2008 | Black |
| 2008/0157967 A1 | 7/2008 | Jones |
| 2009/0125350 A1 | 5/2009 | Lessing |
| 2009/0276338 A1 | 11/2009 | Masermann |
| 2010/0146587 A1 | 6/2010 | Sholes |
| 2010/0252626 A1 | 10/2010 | Elizondo |
| 2011/0035055 A1 | 2/2011 | Applegate |
| 2014/0277710 A1 | 9/2014 | Akdogan |
| 2014/0278508 A1 | 9/2014 | Akdogan |
| 2015/0059626 A1* | 3/2015 | Conrad ............... A01C 21/005 111/120 |
| 2015/0134129 A1 | 5/2015 | Kidder |
| 2015/0186196 A1 | 7/2015 | Elfstrom |
| 2015/0235170 A1 | 8/2015 | Mallers |
| 2015/0375984 A1 | 12/2015 | Arcand |
| 2016/0019494 A1 | 1/2016 | Millett |
| 2017/0000022 A1 | 1/2017 | Conrad |
| 2017/0116654 A1 | 4/2017 | Atwood |
| 2017/0265374 A1 | 9/2017 | Wintemute |
| 2018/0014456 A1 | 1/2018 | Conrad |
| 2018/0092296 A1 | 4/2018 | Conrad |

FOREIGN PATENT DOCUMENTS

| | | |
|---|---|---|
| JP | 2013225696 A | 10/2013 |
| WO | 2015061570 A1 | 4/2015 |
| WO | 2018213428 A1 | 11/2018 |

OTHER PUBLICATIONS

International Preliminary Report on Patentability dated Sep. 18, 2019 in international patent application No. PCT/US2018/032941, 7 pages.

* cited by examiner

TAGGED CONTAINER TRACKING

CROSS-REFERENCE TO RELATED APPLICATIONS

This application is a continuation-in-part of U.S. application Ser. No. 15/614,547 filed Jun. 5, 2017, which application claims the benefit of U.S. Provisional Application 62/346,377 filed Jun. 6, 2016.

U.S. application Ser. No. 15/614,547 is a continuation-in-part of U.S. application. Ser. No. 14/521,908 filed Oct. 23, 2014, which is a continuation-in-part of U.S. application Ser. No. 14/468,973 filed on Aug. 26, 2014 (now abandoned).

U.S. application Ser. No. 14/521,908 filed Oct. 23, 2014 claims benefit of the following U.S. Provisional Applications: No. 61/870,667 filed on Jun. 27, 2013; and, No. 61/895,803 filed on Oct. 25, 2013.

U.S. application Ser. No. 15/816,792 filed on Nov. 17, 2017 is a continuation of U.S. application. Ser. No. 14/521,908 filed Oct. 23, 2014 and claims benefit of the following U.S. Provisional Applications: No. 62/048,628 filed on Sep. 10, 2014; No. 61/895,803 filed on Oct. 25, 2013; and No. 61/870,667 filed Aug. 27, 2013.

U.S. application Ser. No. 15/614,547 filed on Jun. 5, 2017 claims benefit of priority of U.S. Provisional Application No. 62/508,145 filed May 18, 2017.

The entire contents of each of the above-mentioned applications are incorporated herein by reference.

FIELD OF THE INVENTION

This invention relates to monitoring of closed container systems for agricultural products and more particularly to tracking one or more of product quantity, product type, container handling, product dispensing by location, user authentication, and container authentication.

BACKGROUND OF THE INVENTION

Closed delivery container systems utilize containers which can be pre-filled with a wide range of crop input materials such as pesticides (which include, but are not limited to, insecticides, nematicides, fungicides, and herbicides), fertilizers, plant growth regulators, biological agents, and/or other agricultural products. Typically, the product contents of closed delivery containers are transferred from the container to a receiving product reservoir via a connecting mechanism which operates valves that are located on both the container and reservoir. The container valve and the reservoir valve must be opened in order for the contents to pass from the container to the reservoir. Both valves must be closed prior to removal of the container from the connecting mechanism in order to: (1) prevent container contents from leaking from the container; (2) prevent reservoir contents from leaking from the reservoir; (3) prevent contamination of the contents which remain in the container; and (4) prevent contamination of the contents in the reservoir. Since the passage of contents from the product container to the receiving product reservoir is confined within the connecting mechanism between the container and reservoir, agricultural worker protection is enhanced during the content transfer process as a consequence of reduced dermal and inhalation exposure during the transfer process.

The previously described process for transferring the contents from a closed delivery container to a receiving product reservoir can be accomplished multiple times, without limitation, without adverse effects on the integrity of the contents of the product being transferred. Consequently, this process is ideal for transferring the contents of a larger closed delivery container to a smaller closed delivery container in a manner that protects the product being transferred from contamination or loss of efficacy. The previously described valve mechanism is used for both input and output, meaning that product contents are introduced into the closed delivery container and dispensed from the closed delivery container via the same port or opening, which is accessed through the valve mechanism. Product transfers between closed delivery containers can be accomplished through an iterative process, where product from a large bulk container is transferred to a mini-bulk container, which is then transferred again to a yet smaller container that is sized appropriately for manual handling by human personnel. If desired, the same process can be implemented in reverse, meaning that the contents of smaller containers can be transferred to larger containers, and because the container contents are always protected from outside contamination as a consequence of the valve mechanism, partially filled closed delivery containers can be topped off or refilled without completely emptying and cleaning the container before refilling it with the same type product.

Some closed delivery containers are designed for use with product application equipment that enables application of product directly from the closed container, also referred to herein as a cartridge, to a product target without first transferring the container contents to a receiving product reservoir. In such a scenario, without limitation, the product target might be: the furrow into which seed is planted for the purpose of crop production; the seed itself as it is being deposited onto or into the soil; the soil surface in an area that is adjacent to or near the seed furrow; an area of the soil that is below the seed furrow; any soil surface, without regard to the presence or absence of planted seeds; or entire emerged plants or any portion thereof, growing in soil or hydroponically. Patented and patent pending closed delivery systems used with product application equipment and assigned to AMVAC Chemical Corporation of Newport Beach, Calif., include U.S. Pat. No. 7,270,065 and U.S. Patent Application Pub. No. 2017/0000022 by Larry M. Conrad, and U.S. Pat. No. 6,938,564, U.S. Patent Application Pub. Nos. 2018/0014456 and 2018/0092296 by Conrad et al., for example.

SUMMARY

This invention features a method performed by at least one computer processor executing computer program instructions stored on at least one non-transitory computer-readable medium to authenticate and track product use by a user. The method includes entering specific user identity data, cartridge identity data and product identity data into memory associated with at least one cartridge. When the cartridge is in proximity to dispensing equipment operated for the benefit of a current user, including by or on behalf of a current user, the method includes (i) reading cartridge identity data, specific user identity data and product identity data from the cartridge and (ii) reading current user identity data in proximity to the dispensing equipment. In certain embodiments, it is determined whether the cartridge is authorized for use by the current user with the product based on the cartridge identity data, the specific user identity data, the current user identity data, and the product identity data. If the cartridge is determined not to be authorized for use with the product by the current user, then the cartridge is prohibited from dispensing the product. If the cartridge is determined to be authorized for use with the product by the current user, then the cartridge is permitted to dispense the product.

In some embodiments, the method further includes detecting a change in use of the product stored in the cartridge and generating product use data representing the change in use of the product stored in the cartridge. In one embodiment, the generation of product use data is responsive to detection of a change in use of the product. In certain embodiments, the product use data in the memory associated with the cartridge is repeatedly updated during repeated intervals to reflect the change in the use of the product stored in the cartridge during each interval. The product use data includes at least one of product quantity, rate of dispensing, time of dispensing, linear length of treatment by dispensing, location of dispensing, and area of treatment by dispensing. In some embodiments, the method further includes processing the cartridge after dispensing by reading updated product use data from the memory associated with the cartridge and then adding product to the cartridge to refill it based on the updated product use data. In one embodiment, an invoice is generated for the specific user based on the product use data.

In certain embodiments, the memory associated with the cartridge is part of an RFID (Radio Frequency Identification) tag. In a number of embodiments, the current user identity data is read from a user identification source associated with the dispensing equipment, such as an authorization code to enable dispensing by the dispensing equipment. In some embodiments, each entity that takes possession of the cartridge is tracked, and the memory associated with the cartridge is updated with entity possession data. In one embodiment, the method further includes designating a cartridge as the cartridge to be used by or on behalf of the specific user for specific product such as selected agricultural product.

In some embodiments, the method includes repeatedly detecting, at least during dispensing of the product, changes in geographic location of the cartridge, and repeatedly entering and updating geographic information for a plurality of geographic locations, typically sequential geographic locations, with as-applied product data at those geographic locations entered into the memory associated with the cartridge. An as-applied map is generated in certain embodiments to record as-applied quantities of product dispensed at sequential geographic locations at a target area. In one embodiment, the as-applied map is compared to a prescriptive map to generate a difference map indicating at least differences greater than a selected error amount, such as deviations greater than two percent or three percent from prescribed values, between prescribed information in the prescriptive map and as-applied information in the as-applied map relating to quantities and type of product actually dispensed at the sequential geographic locations at the target area. In another embodiment, the as-applied product data is compared to prescriptive application data to generate an error message for differences greater than a selected error amount between prescribed information and as-applied information relating to quantities and type of product actually dispensed at the geographic locations at the target area. In certain embodiments, the method further includes further includes (i) entering vendor ID data into the memory associated with the cartridge prior to dispensing of product from the cartridge, (ii) reading the vendor ID data during processing of the cartridge after dispensing, and (iii) prohibiting adding product to the cartridge until the vendor ID data is determined to be authorized for that product in that cartridge.

This invention also features non-transitory computer-readable medium storing computer program instructions to authenticate and track product use by a user, the instructions including one or more of the methods described herein. This invention may also be expressed as a computer program product to authenticate and track agricultural and/or horticultural product use by a user, the computer program product comprising a non-transitory computer-readable storage medium having computer readable program code embodied therewith, the computer readable program code configured to accomplish one or more of the methods described herein.

This invention further features a system and method that automatically monitors product use data, such as the type and amount of product suitable for at least one of agricultural use and horticultural use that is stored in and dispensed from at least one cartridge over time and/or by geographic location. Monitored data are stored in memory such as a tag on the cartridge and, in certain embodiments, are transmitted to a server and/or an Input/Output device such as a tablet or other mobile device, for storage, aggregation, and analysis. The cartridge may be authenticated before being authorized for use in dispensing the product. The cartridge may be refilled automatically with only the proper type and amount of product needed to fill the cartridge. To ensure that only the proper type of product can be introduced into the cartridge during the refilling process, authentication is conducted in certain embodiments for both the cartridge and the container from which the refill contents will be dispensed. The system for dispensing the contents of the cartridge may be calibrated automatically based a product parameter such as on the weight and/or the bulk density (or liquid viscosity) of the product in the cartridge. Data may be aggregated from a plurality of cartridges automatically.

Other features and advantages of various aspects and embodiments of the present invention will become apparent from the following description and from the claims.

BRIEF DESCRIPTION OF THE DRAWINGS

In what follows, preferred embodiments of the invention are explained in more detail with reference to the drawings, in which.

DETAILED DESCRIPTION

Figure 1:
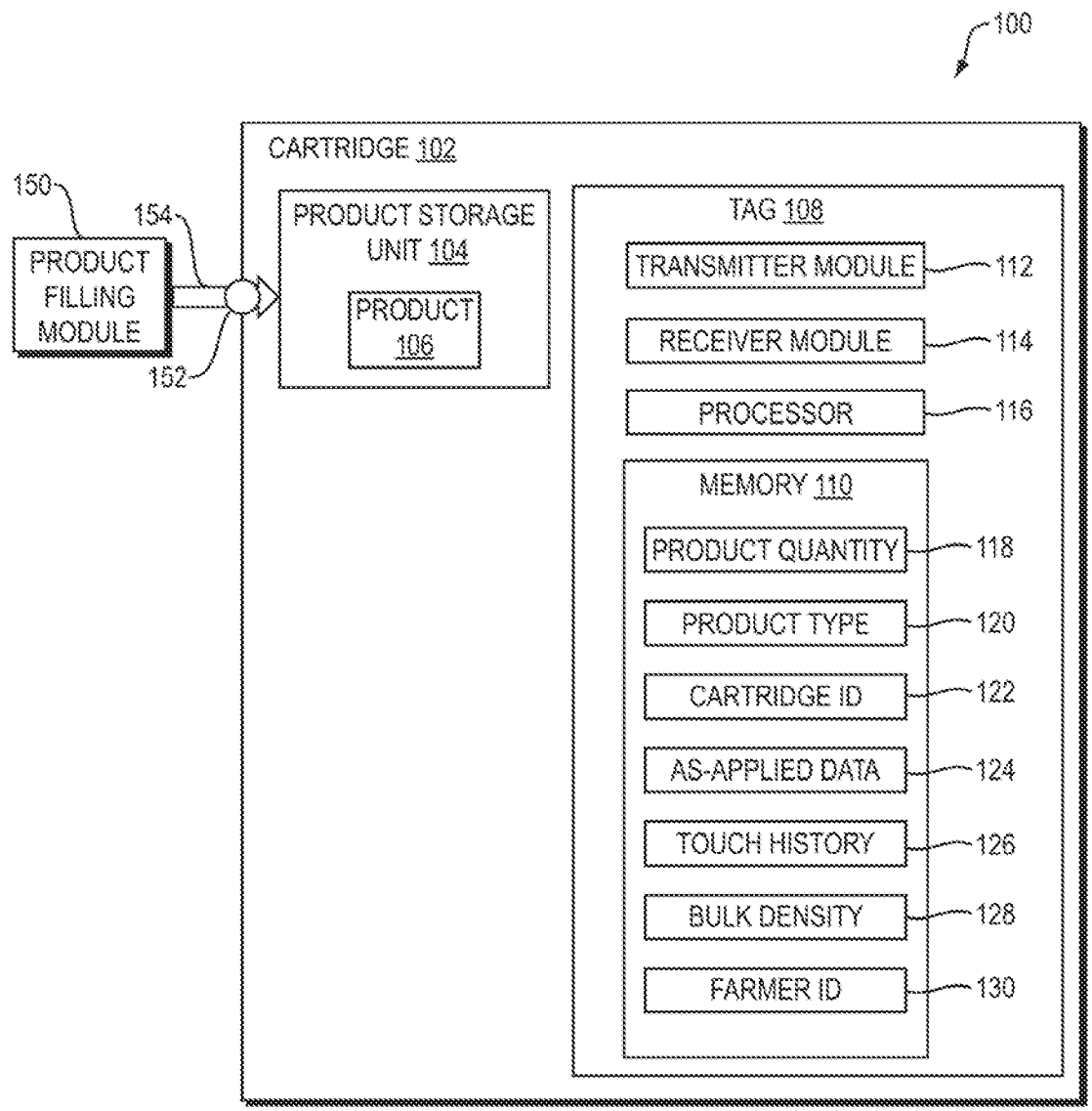
FIG. 1 is a diagram of a system including a tagged cartridge for dispensing product according to one embodiment of the present invention.

This invention may be accomplished by a system, and a method of using the system, having at least one computer processor executing computer program instructions stored on at least one non-transitory computer-readable medium as a method to authenticate and track product use by a user. The method executed by the processor includes entering specific user identity data, cartridge identity data and product identity data into memory associated with at least one cartridge. When the cartridge is in proximity to dispensing equipment operated for the benefit of a current user, including by or on behalf of a current user, the method includes (i) reading cartridge identity data, specific user identity data and product identity data from the cartridge and (ii) reading current user identity data in proximity to the dispensing equipment, such as reading from a user identification source carried by or otherwise associated with the dispensing equipment. It is determined whether the cartridge is authorized for use by the current user with the product based on the cartridge identity data, the specific user identity data, the current user identity data, and the product identity data. If the cartridge is determined not to be authorized for use with the product by the current user, then the cartridge is prohibited from dispensing the product. If the cartridge is determined to be authorized for use with the product by the current user, then the cartridge is permitted to dispense the product. In other words, the current user (or an individual acting on behalf of the authorized current user) becomes an actual user, also referred to herein as an authenticated operator, only after authorization according to the present invention.

When product contents from closed delivery containers are dispensed via application equipment that enables the contents of the container to be applied directly to the product target (such as onto soil, seeds or plants) without product contents being transferred to a receiving product reservoir, the container valve alone opens and closes as required to prevent container contents from leaking from the container, and to prevent contamination of the contents which remain in the container. When used in this manner, the application equipment which is applying the contents of the closed delivery container will be equipped with a mechanism for operating the valve on the closed delivery container. The application equipment will also be equipped with a metering device or devices to ensure product contents from the closed delivery container are dispensed in conformity with all applicable regulations, while preventing leaking or application of closed delivery container product contents to areas other than the intended product target. Certain agricultural apparatus with meter devices and other equipment suitable for use according to the present invention are described by Conrad et al. in U.S. Patent Application Pub. No. 2015/0059626 A1 and by Wintemute et al. in U.S. Patent Application Pub. No. 2017/0265374 (hereinafter "published parent applications") which have been incorporated herein by reference for priority, including the US provisional applications to which they claim benefit. The present invention can also be combined with equipment disclosed in one or more of U.S. Pat. No. 7,270,065 and U.S. Patent Application Pub. No. 2017/0000022 by Larry M. Conrad, and U.S. Pat. No. 6,938,564, U.S. Patent Application Pub. Nos. 2018/0014456 and 2018/0092296 by Conrad et al., for example, which are also owned by the present assignee or an affiliate thereof.

Electronic memory devices (EMD) can be affixed to product containers which are used in closed delivery container systems. Product information can be recorded on the EMD when product contents are added to the container. The information recorded on the EMD is limited only by the storage capacity and limitations of the EMD itself, but without limitation, examples of information that can be stored on the EMD, include a unique identification code for an individual (which is a type of specific user identity data) that is affixed to an individual container, a product name (which is a type of product identity data), EPA registration information (another type of product identity data), the site at which the contents were manufactured (another type of product identity data), the product lot number (still another type of product identity data), the site at which the container was filled, the date when the product was manufactured (yet another type of product identity data), the date when the container was filled, the manufacturer's Stock Keeping Unit (SKU) number, an authorization code that enables operation of an electronically controlled valve system to allow the contents of a closed delivery container to be transferred to another closed delivery container or receiving product reservoir (this code serving as a type of current user identity data), and/or an authorization code that enables operation of an electronically controlled valve system to allow the contents of closed delivery container to be transferred directly to application equipment (this code serving as another type of current user identity data) that will enable an authenticated operator to apply the product contents to a product target without first passing through a receiving product reservoir.

EMDs described in the preceding section can be combined with Radio Frequency Identification (RFID) devices that enable electronic information to be recovered from (read) or added to (write) the EMD by means of radio waves or frequencies. The use of RFID technology to read from and write to an EMD eliminates the requirement for physical/wired electrical connections between an EMD on the closed delivery container and the device that reads and uses information from the EMD, and it also eliminates the requirement for physical/wired electrical connections between the device that sends and Writes information to the EMD. An RFID-equipped EMD is referred to herein as an RFID tag. In addition to RFID tags, other forms of Automatic Identification and Data Capture (AIDC), such as "smart cards" and other devices which can be updated via magnetic fields, optical radiation, or other wireless transmissions, are within the scope of the present invention.

A metering device used to dispense the contents from or add contents to an RFID-tagged closed delivery container can be paired with equipment that monitors, on an almost continuous basis (i.e., multiple times per second), the quantity of product dispensed from or added to the container, and which may update the RFID tag to reflect the quantities of dispensed product. The updated product quantity information may be written to, or otherwise recorded on, the container's RFID tag at any rate (e.g., multiple times per second), which may be the same as, or different from the rate at which the quantity of product dispensed is monitored. Because the container content information is stored on the RFID tag, it is possible to read the information from the RFID tag at points in time that are distant from when the content information was recorded, and still ascertain or know the quantity of product in the RFID-tagged container.

Product from RFID-tagged closed delivery containers may be dispensed using application equipment that utilizes geo-referenced spatial positioning and/or time information from Global Navigation Systems (GNS) such as the Global Positioning System (GPS) satellite-based radio-navigation system that enable very precise (accuracy to within plus or minus 30 centimeters or less) understanding of where product was applied. GPS or other positioning data preferably are enhanced by Real Time Kinematic (RTK) positioning techniques to achieve sub-centimeter-level location accuracy. GPS information is utilized by itself in some embodiments and, in other embodiments, land-based beacons or other positioning and/or time-keeping aids are utilized in combination with, or instead of, GNS information.

Information from a closed delivery container's RFID tag may be combined with the application equipment's spatial positioning information to create and store, on a memory device that is separate and distinct from the container's RFID Tag, a geo-referenced record that indicates precisely where and/or when product from the container was dispensed and applied.

An automatically generated electronic record that indicates precisely where product from an RFID-tagged container was applied eliminates, for the user, the requirement to record by hand the application information associated with product which was dispensed from the RFID-tagged container, while also eliminating the potential for human error associated with hand-written or hand-entered notes or records.

An automatically generated electronic record that indicates precisely which product, the quantity of product, and the location at which product was dispensed from an RFID-tagged container ensures that all product applied from such containers is recorded in a uniformly consistent manner. Because the information that identifies the applied product will come from the coded information on the container's RFID tag, all product that is applied from containers with that same code may be recorded using information that is recorded in the same format. Such uniformity of data makes it easier, faster, and more accurate to aggregate and analyze application data from multiple containers, users, and locations. Accurate and cost-effective analysis of aggregated data enables better and more precise use-recommendations for future application of the same product.

Because each RFID-tagged container can be assigned a code that enables identification of the individual container to which the RFID tag is affixed, and because the Read/Write capability of the RFID tag enables accurate knowledge of the product contents of a partially filled container to be recorded on the RFID tag, suppliers can issue debit and credit invoices to purchasers and/or other types of users of RFID-tagged containers by utilizing equipment that can read the necessary information from the RFID tag affixed to the container. When an RFID tagged container is associated with an individual at the time of purchase, an invoice for the contents of the container may be created by reading and processing the information from the RFID tag affixed to the container. When the user returns the container to the original place of purchase, the RFID tag may again be read by the supplier who conducted the original sale to the user and, from that reading, the net contents remaining in the container may be determined. At that time, a credit may automatically be issued to the user for the unused contents that remain in the RFID-tagged container, so the user incurs a net expense only on the contents dispensed from the container. In one embodiment, the net contents data from the RFID tag might be transferred wirelessly by WiFi, cellular service, or other communication system, to the supplier, obviating the requirement for the supplier to take possession of and scan or read the RFID tag in order to issue a credit invoice for product contents remaining in the cartridge subsequent to use of that container by the authorized user.

Because each closed delivery container is individually identified via a unique code on the RFID Tag affixed to the container, when that unique code is associated with a unique user at the user's time of purchase, multiple RFID-tagged containers from multiple users can, without risk or concern, be commingled at the original place of purchase before being processed for credit for unused contents remaining in each container. In some constructions, the unique code of the specific user includes biometric data such as facial recognition, one or more finger prints or iris scan data. The biometric data can serve as a user identification source for authorizing a current user such as an operator of dispensing equipment; in other constructions, an I/O device for inputting a password, a computer chip on a card or tag on the dispensing equipment with identifier information, or other unique identifier can serve as the user identification source to enable authentication and approval of a current user as an approved specific user and/or as an authorized operator or handler for the cartridge and product therein.

As described above, when partially filled RFID-tagged closed delivery containers are returned to the entity that originally filled the container, or to that entity's refilling agent, the container may be processed by topping off or refilling back to the full level without completely emptying and cleaning the inside of the container prior to refilling it with the same authorized product.

Referring to FIG. 1, a system 100 is shown according to one embodiment of the present invention. The system 100 includes a cartridge 102 for containing and dispensing material, such as agricultural and/or horticultural products. Although the description herein may refer to agricultural products in connection with the cartridge 102, this is merely an example and not a limitation of the present invention. In embodiments of the present invention, the cartridge 102 may store material other than agricultural products, such as material for use in construction, remediation, and other types of industry. Furthermore, the cartridge 102 may store any of a variety of agricultural products, such as fertilizers, nutrients, crop protection chemicals, biologicals, and plant growth regulators, whether in liquid, granular, or other form.

The cartridge 102 may take any of a variety of forms. In general, the cartridge 102 may include an exterior housing, which may be sealed or otherwise be impermeable, with the exception of one or more openings for receiving and/or dispensing agricultural product. The cartridge 102 may be rigid so as to prevent compression clumping of granular materials during storage and/or transportation of the cartridge 102. In another embodiment, the cartridge 102 may contain an inner flexible bag inside the exterior cartridge housing. One purpose of the bag may be to reduce or eliminate the potential for product leakage in the event the exterior cartridge housing is cracked or broken. Another purpose of the bag might be to enable complete removal of the product from the cartridge 102 to enable filling of the rigid cartridge 102 with a different product without first having to wash the inside of the rigid cartridge 102. The flexible inner bag protects the interior of the rigid cartridge 102 from product contamination.

The cartridge 102 may include a product storage unit 104 for storing an agricultural product 106. The product storage unit 104 may, for example, be a discrete container within the cartridge 102 for containing the agricultural product 106 and for preventing the agricultural product 106 from contacting other parts of the cartridge 102. The cartridge 102 may include multiple product storage units. Alternatively, the cartridge 102 may not include any product storage units, in which case the entire interior of the cartridge 102 may play the role of the product storage unit 104 in FIG. 1.

As illustrated in FIG. 1, the product 106 may consume less than all of the product storage unit 104 at any particular point in time. More generally, at any particular point in time, the product storage unit 104 may: (1) be empty (i.e., not contain any of the product 106); (2) contain some amount of the product 106 that is less than the capacity of the product storage unit 104; or (3) be full of the product 106. As will be described in more detail below, the amount of the product 106 in the product storage unit 104 may vary over time. Although the product storage unit 104 may contain multiple types of products simultaneously, typically the product storage unit 104 will contain only a single type of product at any particular time.

The cartridge 102 also includes an element referred to herein as a tag 108. The tag 108 may, for example, be a Radio Frequency Identification (RFID) tag, such as a passive or active RFID tag. More generally, however, the tag 108 may be any component or combination of components which perform the functions disclosed herein.

The tag 108 may be contained within, coupled to, or in communication with the cartridge 102 in any of a variety of ways. For example, the tag 108 may be affixed to an inner or outer surface of the cartridge 102. As another example, the tag 108 may be contained within the cartridge 102. The tag 108 may, for example, be part of an assembly (such as a circuit board) within the cartridge 102. The tag 108 may be physically separate from (e.g., not contained within or coupled to) the cartridge 102, but may be in communication with the cartridge 102, such as via wireless communication.

The tag 108 may include a memory 110 (such as an EMD, as that term is used herein), which may be any kind of volatile or non-volatile memory capable of storing the data disclosed herein. For example, the memory 110 may include product use data such as quantity data 118 which may, as described in more detail below, represent the amount of the product 106 currently contained within the cartridge 102. Other data stored in the memory 110 may include one or more of product type data 120 (also referred to as product identity data), cartridge ID 122, as-applied data 124, touch history data 126, bulk density data 128, and/or farmer ID 130, which is a type of specific user identity data. Other data that is stored in some constructions includes the unique identity of the retailer/supplier/vendor from whom the farmer purchased the cartridge, such as represented by retail ID data, also referred to herein as vendor ID data.

The tag 108 may include a processor 116, which may be any kind of electronic processor. The processor 116 may communicate with the memory 110 to write product use data to and/or read product use data from the memory 110.

The tag 108 may include a transmitter module 112 for transmitting signals, such as by transmitting signals wirelessly. For example, the processor 116 may retrieve data (e.g., product use data such as the product quantity data 118, the product type data 120, and specific user identity data such as farmer ID 130) from the memory 110 and cause the transmitter module 112 to transmit a signal representing the retrieved data.

Similarly, the tag 108 may include a receiver module 114 for receiving signals, such as by receiving signals wirelessly. For example, the receiver module 114 may receive a signal. The processor 116 may determine that the receiver module 114 has received the signal and then, in response, cause the memory 110 to store data (e.g., the product quantity data 118, the product type data 120, and the farmer ID 130) representing or otherwise based on the signal.

The tag 108 need not include all of the elements shown in FIG. 1. Various elements of the tag 108 shown in FIG. 1 may be omitted from the tag 108 and/or be located elsewhere within the cartridge 102. For example, the processor 116 may be located elsewhere within the cartridge 102, rather than in the tag 108, and perform the functions disclosed herein from within the cartridge 102 rather than from within the tag 108. As another example, elements in the tag 108 may be distributed into multiple elements, some of which may be in the tag 108 and some of which may be in the cartridge 102. For example, the processor 116 may be divided into two processors, one in the tag 108 and one elsewhere in the cartridge 102. The functions disclosed herein as being performed by the processor 116 may then instead be performed by the multiple processors in any of a variety of ways.

As will be described in more detail below, embodiments of the present invention may employ one or more cartridges of the kind shown in FIG. 1. Each such cartridge may some or all of the properties of the cartridge 102 shown in FIG. 1. Any description herein of the cartridge 102, and of systems and methods that include and use the cartridge 102, are equally applicable to any number of cartridges implemented according to embodiments of the present invention. Multiple cartridges implemented according to embodiments of the present invention need not be identical to each other. Instead, distinct cartridges implemented according to embodiments of the present invention may differ from each other in various ways and still fall within the scope of the present invention.

Figure 2:
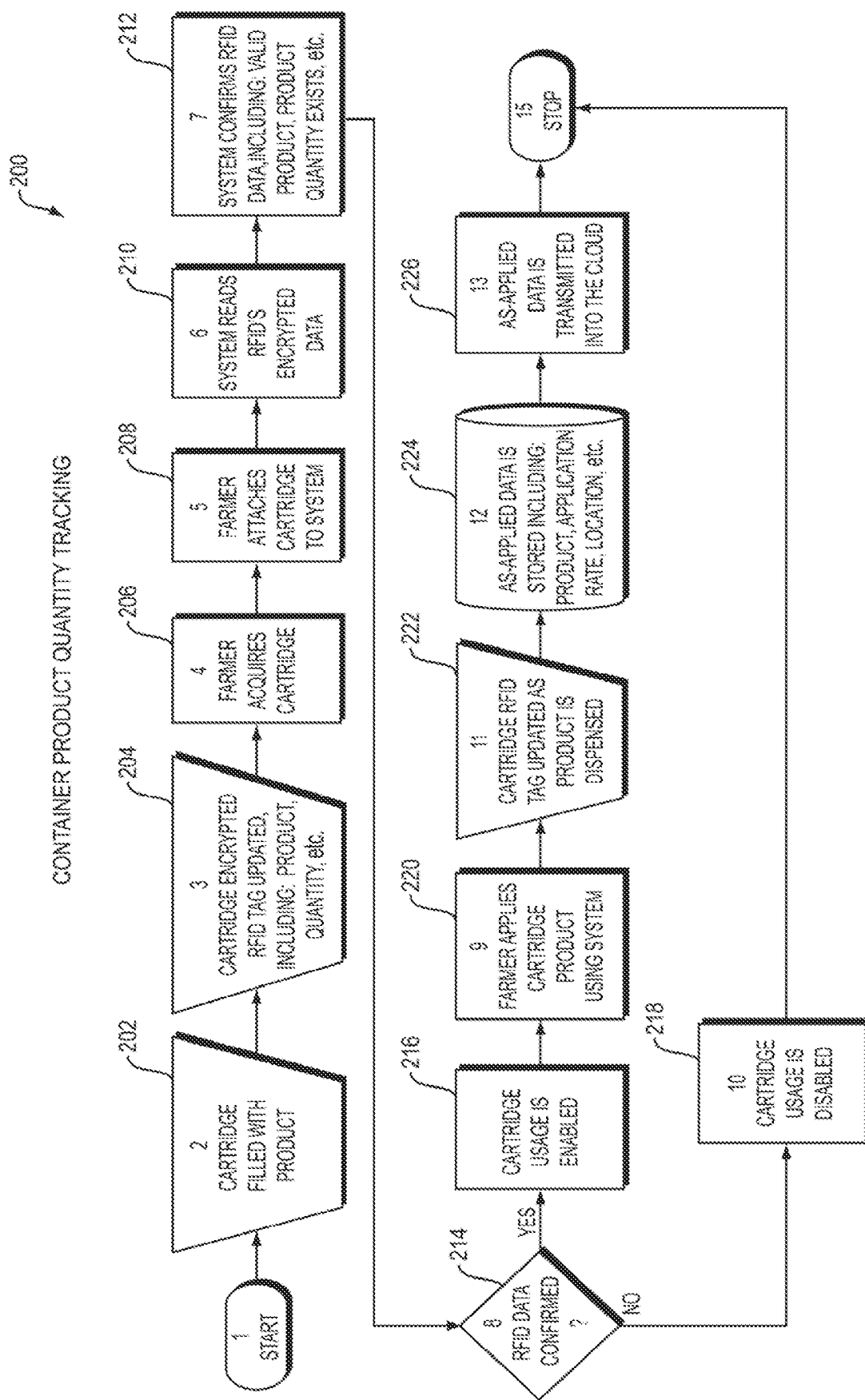
FIG. 2 is a dataflow diagram of a method for tracking changes in the quantity of the product in the tagged cartridge of FIG. 1 according to one embodiment of the present invention.

Referring now to FIG. 2, a dataflow diagram is shown of a method 200 for tracking the quantity of the product 106 in the cartridge 102, FIG. 1, over time. The cartridge 102 is filled with the product 106 as represented by operation 202, FIG. 2. Such filling may be performed in any of a variety of ways. As a simple example, the cartridge 102 is shown in FIG. 1 as having a port 152. A product filling module 150, which contains or otherwise has access to the product with which the cartridge 102 is desired to be filled, is coupled to the port 152 via a suitable coupling 154, and the product filling module 150 then provides product to the cartridge 102 via the coupling 154, where the product is then received into the product storage unit 104 as product 106. The product filling module 150 may provide any amount of the product 106 to the cartridge 102. The product filling module 150 may, for example, provide the product 106 to the cartridge 102 until the product storage unit 104 is full of the product 106, although this is not required.

The system 100 generates product use data to repeatedly update the tag 108 in the cartridge 102 based on the filling of the cartridge 102 with the product 106 (FIG. 2, operation 204). This product use data updating may be performed in any of a variety of ways. For example, the tag 108 may be in communication with the product storage unit 104 via a connection 156, which may be any kind of wired and/or wireless connection. The tag 108 may receive information about the filling of the product storage unit 104 with the product 106, and the tag processor 116 may update the tag memory 110 based on the received information. Examples of information that the processor 116 may store in the memory 110 in response to the filling of the product storage unit 104 include any one or more of the following, in any combination, whether or not specifically shown in FIG. 1: the type (e.g., manufacturer and/or product name) of the product 106 (in product type data 120), the amount of the product 106 that was contained in the product storage unit 104 before the filling process began, the amount of product 106 added to the product storage unit 104 during the filling process, the amount of product 106 contained in the product storage unit 104 as the result of the filling process, a unique identifier of the tag 108, EPA registration information for the cartridge 102 and/or product 106, a site at which the product 106 was manufactured, a lot number for the product 106, a site at which the cartridge 102 was filled with the product 106, a date on which the product 106 was manufactured, a date on which the cartridge 102 was filled with the product 106, and a manufacturer's stock keeping unit (SKU) number for the product 106. Any product amounts described above may be stored in the product quantity data 118.

The tag updating process described above in connection with operation 204 of FIG. 2 may be performed any time product is added to the product storage unit 104. For example, if some amount of product 106 is added to the product storage unit 104 at a first time and the tag 108 is updated as described above, and then at a later time product 106 is again added to the product storage unit 104, the tag updating process may be performed again in connection with the additional filling of the product storage unit 104. The resulting data (e.g., product type and/or quantities) may be stored in the memory 110. As will be described in more detail below, such new data may replace (overwrite), be appended to, or otherwise combined with existing data in the memory 110. In the event that a cartridge tag is damaged or destroyed, cartridge data stored in the application equipment memory system may be used to enable creation of a new/replacement tag without loss of any data from the previous tag. Prior to refilling, information from the tag of a cartridge to be refilled can be stored on a memory device associated with the refilling equipment. When the tag information from the cartridge is stored in the memory device that is associated with the refilling equipment, the cartridge tag can be removed and replaced, after which the tag information from the removed tag can be written to the new/replacement tag, with no loss of information from the tag that was removed. The new/replacement tag can then be updated during the refilling process in a manner that is consistent with process described in the earlier portion of this paragraph that describes the tag updating process. An essential element of the cartridge filling and refilling process is the requirement of an authorization code from the cartridge tag and an additional authorization code from the tag on the transfer container from which product will be transferred into the cartridge. If the authorization codes from the cartridge to be refilled and the transfer container from which the refill product will be transferred do not agree or are otherwise determined to be incompatible and/or unauthorized, then product transfer from the transfer container to the cartridge will be disallowed.

A farmer acquires the cartridge 102 (FIG. 2, operation 206). Although reference is made herein to a "farmer," this term should be understood to refer to any person or entity who purchases, leases, or otherwise takes possession and/or control of the cartridge 102, whether or not that person or entity is a farmer. This entity taking possession can be identified by entity possession data according to one aspect of the present invention. Furthermore, although the acquisition of the cartridge 102 by the farmer is shown in FIG. 2 as occurring after the filling of the cartridge 102 with the product 106, this is merely an example and not a limitation of the present invention. Alternatively, for example, the farmer may acquire the cartridge 102 before the cartridge 102 is filled with the product 106, in which case the filling of operation 202 and/or the updating of operation 204 may occur after the farmer has acquired the cartridge 102.

Figure 3:
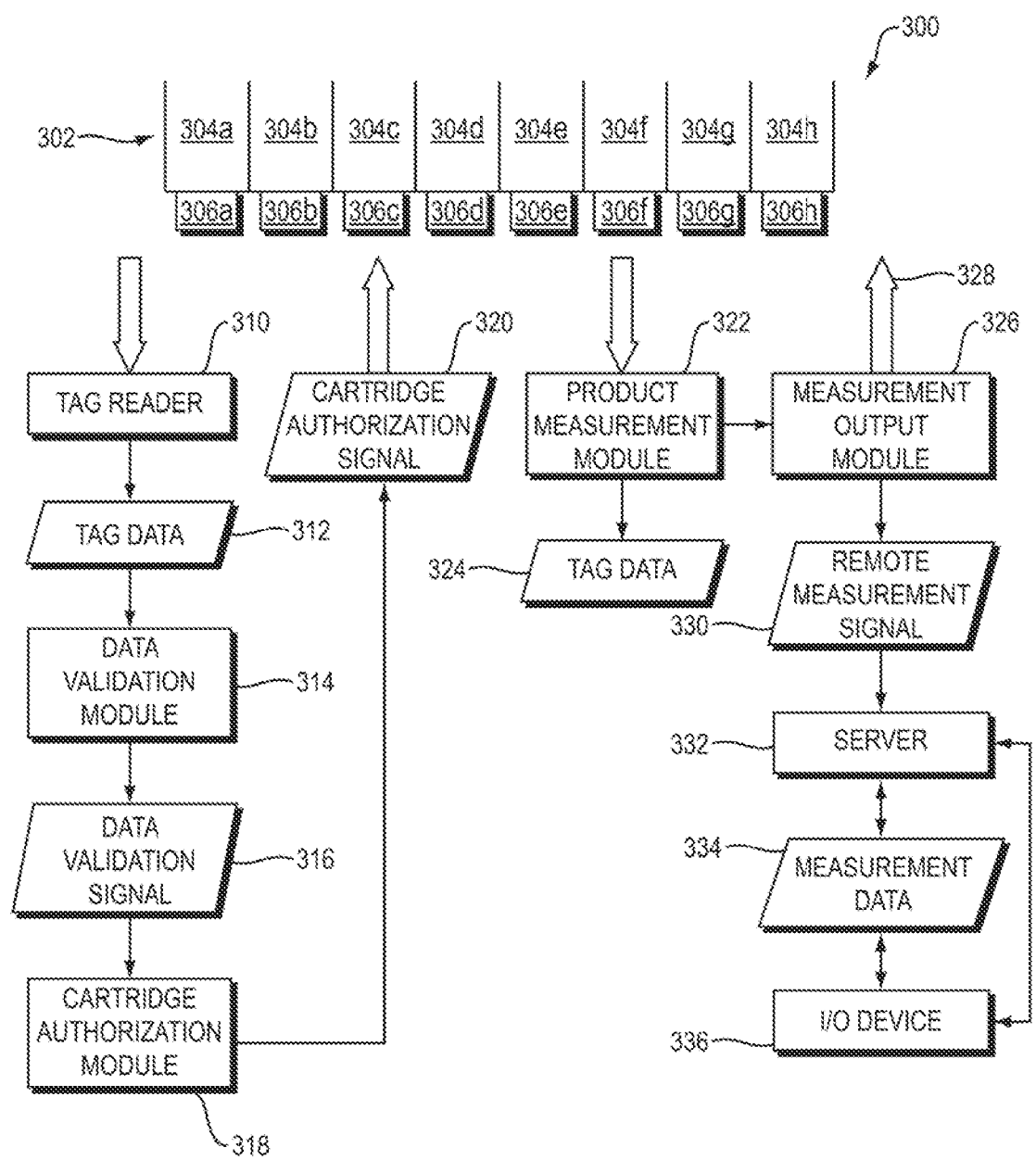
FIG. 3 is a diagram of a system for tracking changes in the quantity of the product in the tagged cartridge of FIG. 1 according to one embodiment of the present invention.

Before describing the remainder of the method 200 of FIG. 2, consider now the system 300 of FIG. 3. The system 300 includes a product dispensing assembly 302, which contains a plurality of receptacles 304a-h and a plurality of corresponding meters 306a-h. Each of the receptacles 304a-h is configured to receive a corresponding cartridge, such as the cartridge 102 of FIG. 1. When a cartridge is inserted into one of the receptacles 304a-h, the corresponding one of the meters 306a-h may dispense product from the inserted cartridge via a valve in the cartridge. For example, the port 152 shown in FIG. 1 may include a valve, which may be used both to receive the product 106 for filling the cartridge 102 and for dispensing the product 106 from the cartridge 102 via the corresponding meter. As used herein, the term meter is applicable to devices capable of applying both dry and liquid products. Although system 300 utilizes a single receptacle per row, in other constructions two or more receptacles are provided per row such that multiple cartridges can be utilized per row to dispense multiple dry and/or liquid products per row. For example, FIG. 7 of Wintemute et al., published parent application U.S. Patent Application Pub. No. 2017/0265374A1, illustrates a planter 122 having 16 sets A, B of agricultural product containers, shown side by side.

The product dispensing assembly 302 may be attached to an apparatus for dispensing product on a field such as a field for food crops, a plant nursery, a golf course, a sod farm, a turf field, or other type of agricultural and/or horticultural land use. Although eight receptacles 304a-h and corresponding meters 306a-h are shown in FIG. 3 for purposes of example, the product dispensing assembly 302 may contain any number of receptacles and meters per planter row unit. Typical planters include 16 or 24 rows for corn, 12 or 16 rows for cotton, and 4 or 6 rows for potatoes. Systems according to the present invention can utilize multiple cartridges per row. These are merely examples, however, and do not constitute limitations of embodiments of the present invention. Instead, embodiments of the present invention may be used in connection with product dispensing assemblies having any number of receptacles and meters per row and overall for the simultaneous application of any combination of multiple dry and/or liquid products.

Returning to FIG. 2, the farmer may attach the cartridge 102 to the product dispensing assembly 302, such as by inserting the cartridge 102 into one of the receptacles 304a-h (FIG. 2, operation 208). Assume, for purposes of example, that the farmer attaches the cartridge 102 into receptacle 304a, with corresponding meter 306a. As a result, the meter 306a may dispense product 106 from the cartridge 102 in the field.

The system 300 may include one or more tag readers for reading a tag on each cartridge when that cartridge is in proximity to product dispensing assembly 302. For ease of illustration, FIG. 3 shows a single tag reader 310. In practice, the system 300 may, for example, include one tag reader for each of the receptacles 304a-h and corresponding inserted cartridges. For example, the receptacle 304a may include a tag reader, which may be capable of reading data from tag 108 on cartridge 102 once the cartridge 102 has been inserted into the receptacle 304a. The tag reader for each receptacle may, for example, be affixed to, contained within, or otherwise located on, in, or near the receptacle. The tag readers may, for example, be RFID tag readers or otherwise be wireless tag readers.

The tag reader 310 reads some or all of the data from the tag 108 in the cartridge 102 (FIG. 2, operation 210). Some or all of the data in the tag 108 may be encrypted, in which case the tag reader 310 may read such data from the tag 108 and then decrypt the encrypted data.

The system 300 also includes a data validation module 314. In general, the data validation module 314 receives the tag data 312 that was read by the tag reader 310 and validates the tag data 312 (FIG. 2, operation 212). Such validation may be performed in any of a variety of ways. In general, the data validation module 314 determines, based on the tag data 312, whether the cartridge 102 from which the tag data 312 was read should be permitted to dispense its product 106. The output of the data validation module 314 is a data validation signal 316 indicating whether the cartridge 102 should be permitted to dispense its product 106.

The data validation module 314 may, for example:
Determine, based on tag data relating to the product 106 (such as the product quantity data 118 and/or product type data 120), whether the product 106 is a valid product.
Determine, based on tag data relating to the product 106 (such as the product quantity data 118 and/or product type data 120), whether the cartridge 102 contains a sufficient quantity of the product 106 to be used in the field, such as by determining whether the quantity of the product 106 in the cartridge 102 falls below some predetermined threshold amount.
Determine, based on the cartridge ID 122, whether the cartridge 102 is a valid cartridge.
Determine, based on specific user identity data in the tag data and on current user identity data read in proximity to the dispensing equipment, whether the cartridge 102 is authorized for use with that dispensing equipment in general and/or by the particular operator of that equipment, or is authorized for use with a particular receptacle and/or dispensing meter in that equipment.

The system 300 also includes a cartridge authorization module 318, which receives the data validation signal 316 and determines, based on the data validation signal 316, whether to authorize the cartridge 102 from which the tag data 312 was obtained for use (FIG. 2, operation 214). The cartridge authorization module 318 may, for example, determine that the cartridge 102 is authorized for use if the data validation signal 316 indicates that the tag data 312 are valid, and determine that the cartridge 102 is not authorized for use if the data validation signal 316 indicates that the tag data 312 are not valid.

The cartridge authorization module 318 reviews current user identity data and produces a cartridge authorization signal 320 as output. The system 300 uses the cartridge authorization signal 320 to determine whether to enable or disable the cartridge 102 from which the tag data 312 was read. The cartridge authorization signal 320 may both specify a particular cartridge and/or receptacle (e.g., cartridge 102 and/or receptacle 304a and/or dispensing meter 306a such as based on unique identifier codes for those components) and indicate whether to enable or disable the specified cartridge/receptacle, such as whether the cartridge identity data is approved for the current user identity data for that receptacle and/or dispensing meter. The system 300 may enable or disable the specified cartridge/receptacle in accordance with the cartridge authorization signal 320. For example, if the cartridge authorization signal 320 specifies cartridge 102 and indicates that cartridge 102 is to be enabled, then the system 300 may enable cartridge 102 for use (or not take any action to disable cartridge 102 for use) (FIG. 2, operation 216). If the cartridge authorization signal 320 specifies cartridge 102 and indicates that cartridge 102 is to be disabled, then the system 300 may disable cartridge 102 for use (FIG. 2, operation 218). If the cartridge 102 is disabled, then the system 300 may prevent the corresponding meter 306a from dispensing any product 106 from the cartridge 102. In one embodiment, when a single cartridge is disabled due to the absence of an authorization signal, all cartridges might be disabled until the disabled cartridge is replaced with an authorized/enabled cartridge, or until the operator enters an over-ride code that enables the system to apply product from cartridges in all other receptacles except for the individual receptacle or receptacles that are disabled due to the absence of an authorization signal.

Assuming that the cartridge 102 is enabled, now assume that the product dispensing assembly 302 is put into use to dispense product from the containers that are attached to it, such as cartridge 102 in receptacle 304a. As the cartridge 102 dispenses its product (via corresponding meter 306a) (FIG. 2, operation 220), the system 300 uses a product measurement module 322 to measure product use data including the amount of product 106 being dispensed from the cartridge 102. The product measurement module 322 produces a measurement signal, shown in FIG. 3 as Tag Data 324, representing the measured amount of the product 106 being dispensed from the cartridge 102. The Tag Data 324 in this construction is transmitted to a measurement output module 326; in other constructions, the Tag Data 324 is transmitted to a remote Server 332 and/or an Input/Output ("I/O") Device 336. The measurement output module 326 receives the measurement signal 324 as input in this construction and provides a tag writing signal 328 to the tag 108, thereby causing the tag 108 to repeatedly update the product quantity data 118 on the tag 108 to reflect the amount of product 106 dispensed and/or the remaining amount of product 106 in the product storage unit 104 (FIG. 2, operation 222). The system 300 may measure the amount of product 106 being dispensed from the cartridge 102 in any of a variety of ways. For example, if the meters 306a-h are auger meters, the system 300 may calculate the quantity of product dispensed by the meter 306a as a function of the number of times the auger rotates and/or the number of times and the duration of time at which the meter 306a is operated. In some constructions, system 300 counts the revolutions, strokes, openings, impulses, flow rate, and/or cycle-time of a dispensing meter and calculates the quantity of product dispensed from the cartridge with each measured cycle or operational unit. The system 300 may update the product quantity data 118 in the tag with any regular or irregular frequency, such as ten times per second, five times per second, two-to-four times per second, three times per second, once per second, once per ten seconds, or once per minute. In certain constructions, a back-up record of product use data is stored with the dispensing equipment, such as on storage media associated with the dispensing meter, an EMD associated with the application equipment control system, or a remote server.

The system 300 may update various "as-applied" data 124 in the tag 108 in addition to the product quantity data 118 as the product 106 is being dispensed from the cartridge 102 (FIG. 2, operation 224). The as-applied data 124 may, for example, include any one or more of the following, in any combination:
- an identifier of the product 106 being dispensed by the cartridge 102;
- the rate at which the product 106 is being dispensed by the cartridge 102;
- the current location of the cartridge 102; and
- the current time.

Any of the data disclosed herein, such as the as-applied data 124, may include one or more timestamps indicating one or more times associated with the data, such as a time at which the data was captured, created, or transmitted. Similarly, any of the data disclosed herein, such as the as-applied data 124, may include geographic information, such as geographic coordinates indicating a location associated with the data, such as a location at which the data was captured, created, or transmitted. Any such geographic information may, for example, be obtained automatically, such as by using GPS technology. The system 300 may, for example, include a GPS module (not shown herein), such as georeferencing module 12, FIG. 1 of Wintemute et al. in published parent application U.S. Patent Application Pub. No. 2017/0265374A1, for example, which generates output representing a current location of the system 300. Time may also be provided remotely such as via the GPS signal or through a separate clock or other time-keeping device. The system 300 may use the output of such a GPS module to generate and store any of the location data disclosed herein. Embodiments of the present invention may correlate various data with each other using any of the timestamps and/or geographic information disclosed herein. For example, any two units of data having the same or similar timestamp may be correlated with each other. Similarly, any two units of data having the same or similar geographic location may be correlated with each other.

When new data are stored in the tag 108, such new data may overwrite data previously stored in the tag 108. For example, when the new current amount of the product 106 contained in the cartridge in the container 102 is stored in the product quantity data 118 in the tag, this new current amount may overwrite the previous current amount of the product 106 in the product quantity data 118. As described below, however, the previous product quantity data 118 may not be lost to the system 300 as a whole, because the product quantity data 118 (and other data contained in the tag 108) may be transmitted to a server 332 and stored remotely.

As described above, the measurement output module 326 may update the tag 108 on the cartridge 102 with information about the remaining amount of the product 106 in the cartridge 102 and with new as-applied data. The measurement output module 326 may update the tag 108 by, for example, using a local communication technology, such as transmitting the signal 328 via BlueTooth, WiFi, MiWi, or a local wired connection. In addition, the measurement output module 326 may transmit a remote measurement signal 330 to a server 332 (FIG. 2, operation 226). The remote measurement signal 330 may be transmitted using a network communication protocol, such as TCP/IP, over a Wide Area Network (WAN), such as the Internet, via a wired and/or wireless signal.

The term "server" is used in a broad sense of the term to include computer programs and/or devices that provide functionality for other programs or devices which may be referred to as "clients". The server 332 may be any kind of computing device, whether or not the server 332 communicates using a client-server protocol. The server 332 may receive the remote measurement signal 330 and store the data represented by the remote measurement signal 330 as measurement data 334. For example, if the remote measurement signal 330 contains data representing an identifier of the cartridge 102, an identifier of the product 106, a timestamp, a geographic location, and an amount of the product 106 that was dispensed by the cartridge 102 at the time indicated by the timestamp at the geographic location, the server 332 may store all such data as the measurement data 334 in a memory storage device, which is also represented by reference numeral 334 in FIG. 3. The system 300 may transmit remote measurement signals 330 repeatedly over time as the cartridge 102 (and other cartridges in the product dispensing assembly 302) dispenses its product 106 over time, in response to which the server 332 may store in memory some or all of the data represented by those measurement signals 330 as measurement data 334, and/or communicate the measurement data 334 to an Input/Output (I/O) device 336 such as a tablet or other mobile computing device. As a result, the measurement data 334 may be stored and/or transmitted as a record of products dispensed over time by the cartridge 102 (and other cartridges).

Figure 10:
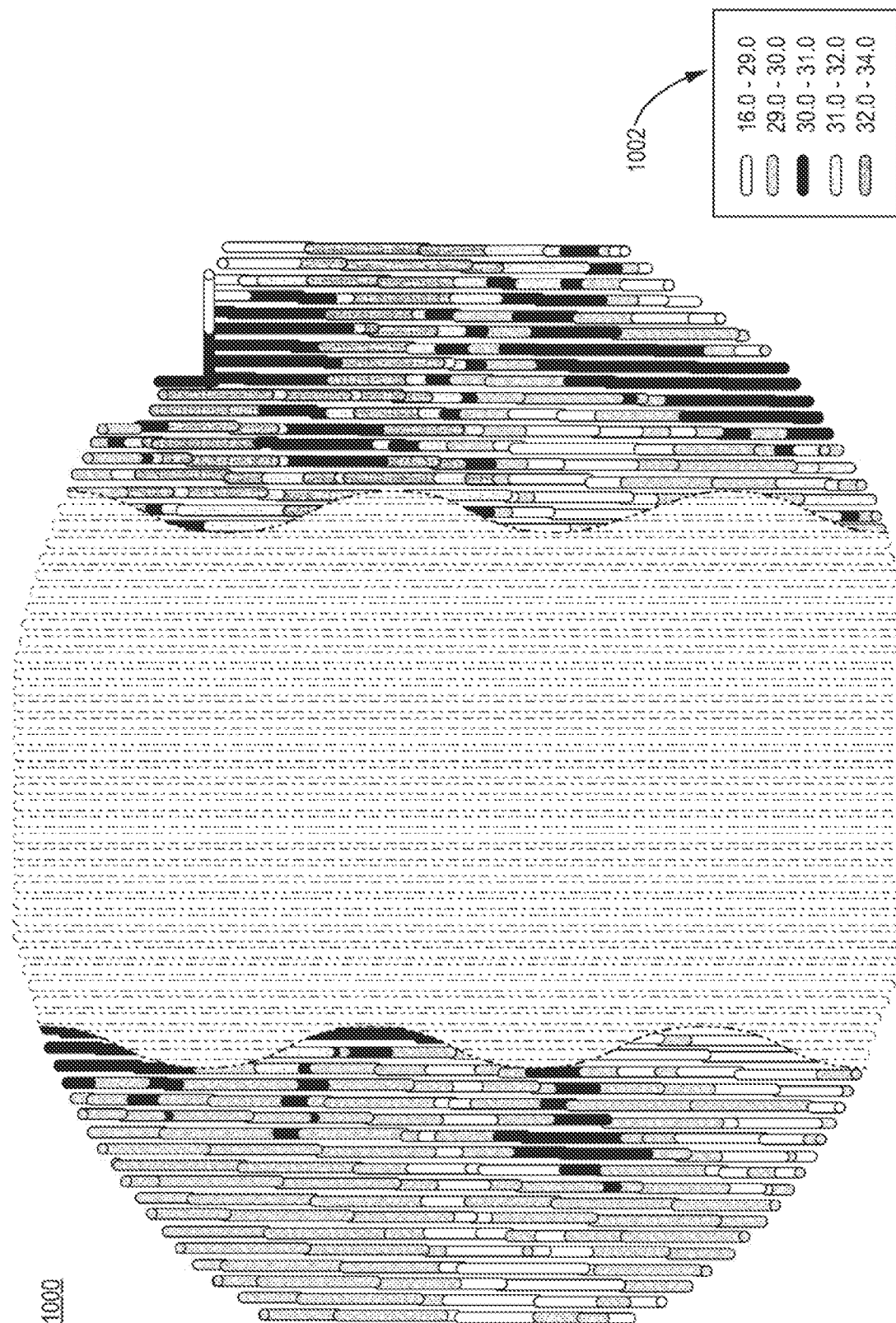
FIG. 10 is a schematic representation of an as-applied map according to one embodiment of the present invention.
Figure 11:
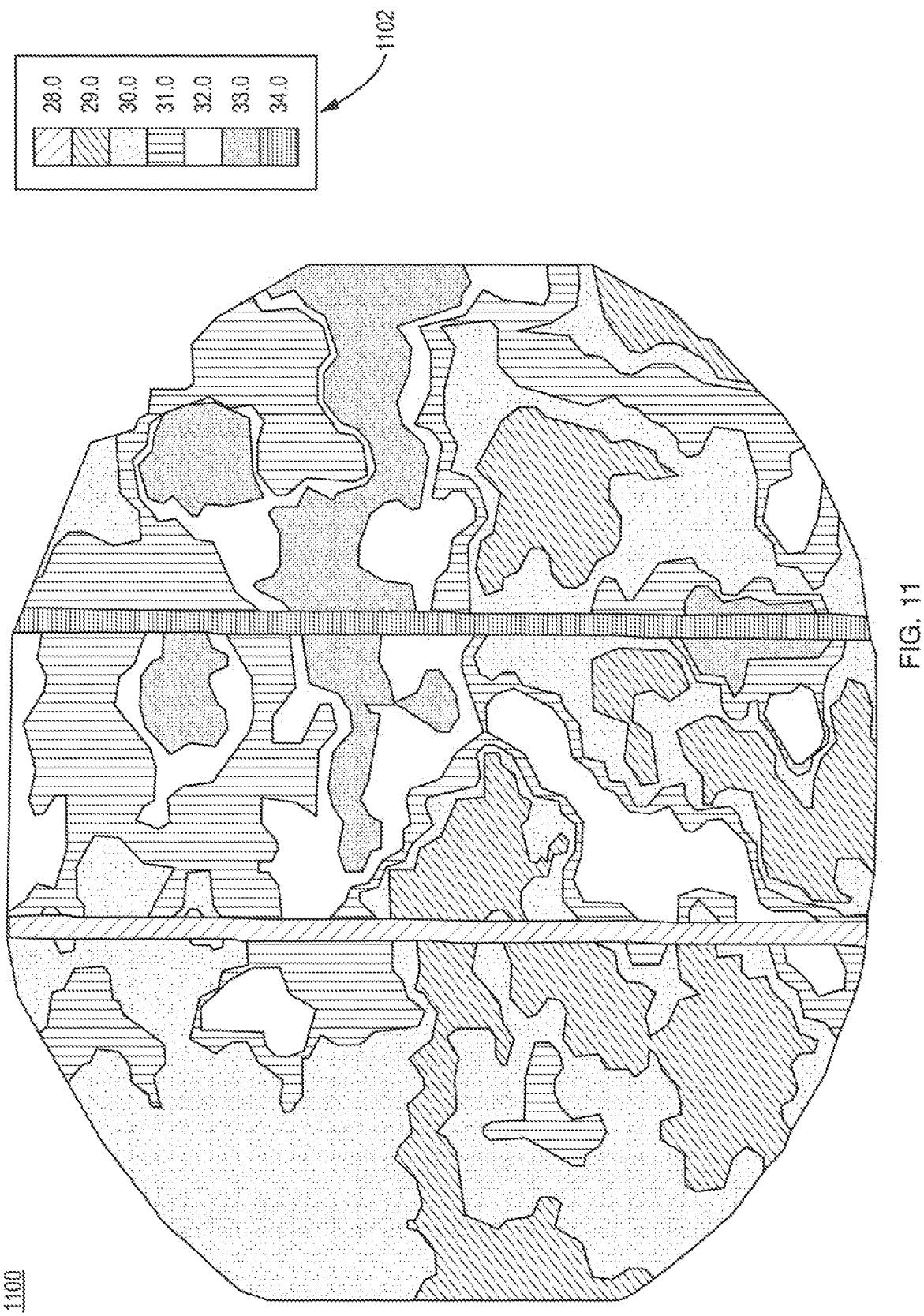
FIG. 11 is a schematic representation of a prescriptive map which can be compared with the as-applied map of FIG. 10 to prepare a difference map according to one embodiment of the present invention.

One reason to transmit and store the as-applied data over time is to enable the server 332 to create an "as-applied map" of the product 106 as it is actually applied to the field over time. The system 300 may, for example, apply the product 106 based on pre-selected data represented by a prescriptive map, which indicates the amount of the product 106 that is intended to be applied at each of a variety of locations in the field. An as-applied map 1000, FIG. 10, and a prescriptive map 1100, FIG. 11, are described below. The system 300 may then vary the rate at which the product 106 is applied at different locations in the field, in an attempt to apply, at each such location, the amount of the product 106 that the prescriptive map specifies should be applied at that location. The actual amount of the product 106 that the system 300 applies at any particular location in the field may, however, deviate from the amount that the prescriptive map indicates should be applied. The system 300 may use the measurements of the actual amounts of the product 106 that were applied at various locations in the field to create an as-applied map for the product 106. The system 300 may then compare the prescriptive map to the as-applied map to identify any variations between the amount of the product 106 that was prescribed to be applied at each of a plurality of locations and the amount of the product 106 that was actually applied at each of those locations.

One advantage of the techniques disclosed above for tracking changes in use of product stored in each cartridge, such as changes in the quantity of the product 106 over time, is that these techniques may be performed in real-time, i.e., while quantities of the product 106 are being added to and/or dispensed from the cartridge 102. The term "real-time," as used herein in connection with tracking changing quantities of the product 106, refers to tracking such changes and repeatedly updating the tag 108 accordingly, at repeated intervals without a substantial delay between the change in the quantity or other use parameter of the product 106 and the resulting update(s) to the corresponding product use data in the tag 108 (e.g., the product quantity data 118 and/or the product type data 120). For example, the system 100 may update the tag 108 to reflect a change (i.e., increase or decrease) in the quantity of the product 106 in the cartridge 102 (e.g., by storing the increase/decrease and/or the resulting amount of the product 106 in the product quantity data 118) at repeated intervals within no more than 1 millisecond, 10 milliseconds, 100 milliseconds, 300 milliseconds, 500 milliseconds, 1 second, 5 seconds, 10 seconds, or less than or equal to 1 minute of such a change in quantity occurring or being detected. As another example, the system 100 may update the tag 108 to reflect a change in the geographic location of the cartridge 102 (e.g., by storing data identifying successive geolocations in the as-applied data 124) within no more than 1 millisecond, 10 milliseconds, 100 milliseconds, 1 second, 5 seconds, 10 seconds, or 1 minute or less of such a change in type occurring or being detected. All of these examples constitute "real-time" tracking of the product quantity/location, as that term is used herein, at repeated intervals. In certain constructions, the repeated intervals of updating begin with a change in circumstances for the cartridge, such as when the cartridge is connected to another device such as a product filling or refilling device, or when the cartridge is connected to dispensing equipment. In some constructions, signals representative of real-time tracking, such as error messages for incorrect dispensing or low-quantity warnings, are provided to the farmer or other user via a tablet or other I/O device such as I/O Device 336, FIG. 3.

Another advantage of the techniques disclosed above for tracking changes in the quantity of the product 106 over time is that these techniques may be performed automatically, i.e., without human intervention. For example, existing systems typically require the human operator of a tractor or planter to manually record the amount of product that has been applied to a field. This manual process has a variety of drawbacks. For example, manual recording of product application is prone to error for a variety of reasons, such as the difficulty of manually measuring the amount of product that has been dispensed and limitations in the operator's memory. As another example, manual recording of product application is prone to intentional fraud. As yet another example, manual recording can require a significant amount of effort, which may result in delays in the recording process. Embodiments of the present invention address all of these problems. For example, embodiments of the present invention may track changes in the product 106 in the cartridge 102 (such as changes in the type of the product 106, increases in the quantity of the product 106, and decreases in the quantity of the product 106) automatically, i.e., without requiring manual human input. Such automatic tracking may be performed, for example, in the method 200 of FIG. 2 in operation 202 (filling the cartridge 102), operation 222 (updating the tag 108 as the product 106 is being dispensed), and operation 224 (updating the as-applied data 124). This automatic tracking eliminates the need for the human operator to perform tracking manually and thereby avoids all of the problems of manual tracking described above. Furthermore, embodiments of the present invention may even prohibit the human operator from manually recording or modifying automatically-recorded information (such as the product quantity data 118, product type data 120, cartridge ID 122, and as-applied data 124), thereby both eliminating the risk of inadvertent human error and the risk of intentional fraud.

Furthermore, embodiments of the present invention may track and record product-related data both automatically and in real-time. This combination of features enables changes in the type and quantity of the product 106 to be tracked more quickly, easily, and reliably than existing systems which rely on manual human input. For example, by automatically monitoring the rates at which the product 106 is applied in various locations over time, by tying such information to the ID 122 of the cartridge 102 that dispensed the product 106, and by transmitting all such data to the server 332 for storage in the measurement data 334, embodiments of the present invention may create an as-applied map of the product 106 as actually applied to the field, all without the involvement of the operator or farmer. Such capabilities provide real inventory management benefits to the manufacturers of the product 106 and to the supply chain between the manufacturer and the end user of the cartridge 102. Furthermore, these features eliminate the burden of having to store the as-applied data locally (e.g., in a flash drive or other physical medium) and then to physically transport it to a computer, by enabling the as-applied data to be transmitted wirelessly, automatically, and in real-time to the server 332.

The ability to generate an as-applied map automatically enables the agricultural products that were applied to specific crops to be tracked without being dependent on manual reporting from farmers for veracity or accuracy. This ability to track which products were applied to individual crops, independently of farmer reporting, is particularly useful for satisfying demands from consumers to know which products were applied to the foods they purchase and for satisfying the need of regulatory agencies and food processors to obtain access to field-specific agricultural product use.

As described above, quantities of the product 106 may be dispensed from the cartridge 102 over time, thereby resulting in decreases in the amount of the product 106 in the cartridge 102 over time. Embodiments of the present invention may be used to add more of product 106 to the cartridge 102, which may include adding more of the same type of product that was previously contained in the cartridge 102, or adding a different type of authorized product to the cartridge 102 than was previously contained in the cartridge 102. Any such process of adding any amount of the authorized product 106 to the cartridge 102 is referred to herein as "refilling" the cartridge 102, whether or not such refilling results in the cartridge 102 (or the product storage unit 104) being full of the product 106.

Figure 4:
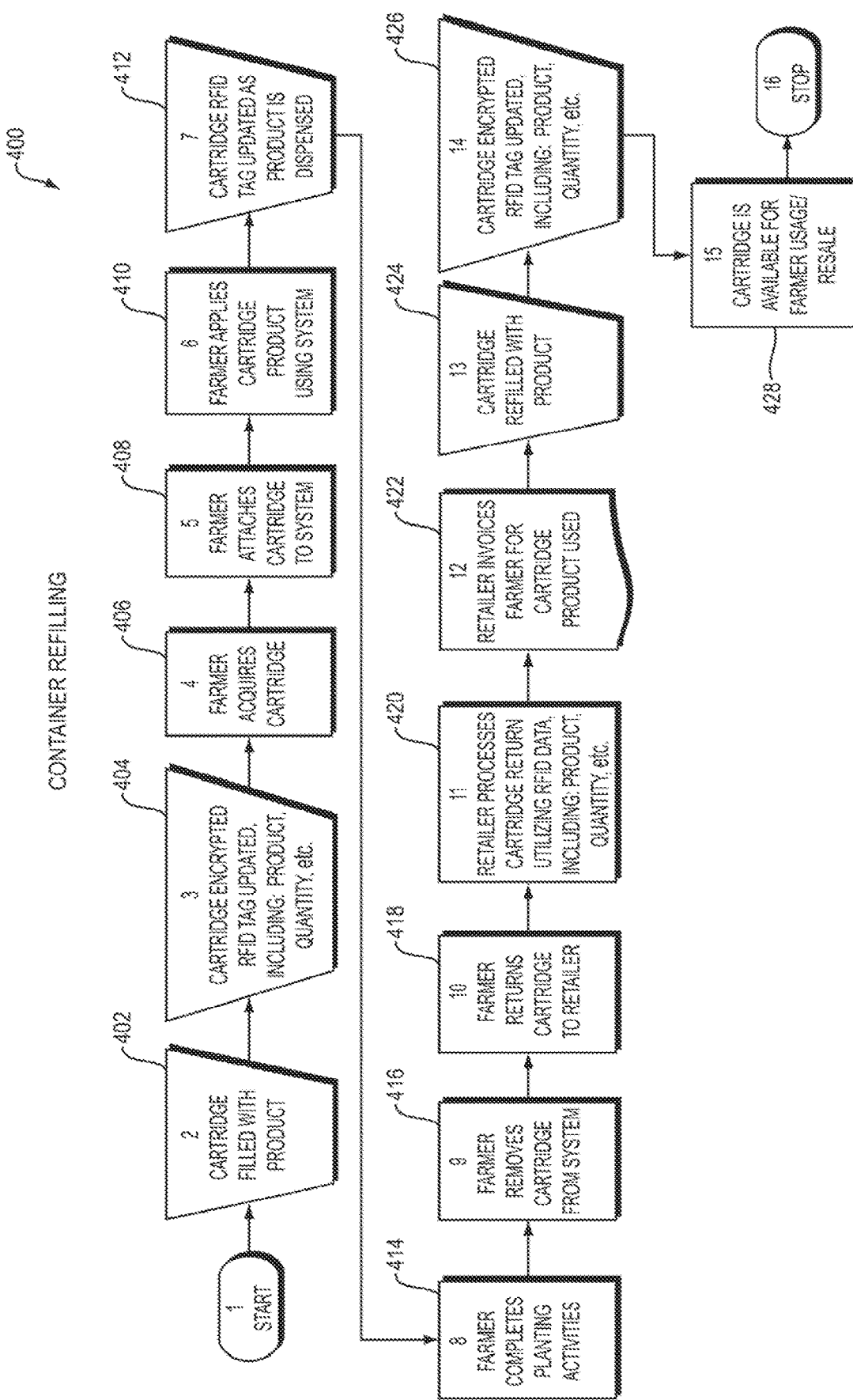
FIG. 4 is a dataflow diagram of a method for refilling the tagged cartridge of FIG. 1 with a product automatically according to one embodiment of the present invention.

Referring now to FIG. 4, a dataflow diagram is shown of a processing method 400 for refilling the cartridge 102 with the product 106. Although the method 400 of FIG. 4 is described herein as being applied to the cartridge 102, the method 400 may be applied to any number of cartridges, e.g., sequentially (serially) or in parallel. For example, the method 400 may be applied to some or all of the cartridges inserted into the receptacles 304a-h in the system 300 of FIG. 3.

The cartridge refilling method 400 includes the cartridge 102 being filled with the product 106 (FIG. 4, operation 402), the cartridge tag 108 being updated with product information (operation 404), the farmer acquiring the cartridge 102 (FIG. 4, operation 406), the farmer attaching the cartridge 102 to the product dispensing assembly 302 (FIG. 4, operation 408), the tag reader 310 reading some or all of the data from the tag 108 in the cartridge 102 (FIG. 4, operation 410), and the data validation module 314 receiving the tag data 312 that was read by the tag reader 310 and validating the tag data 312 (FIG. 4, operation 412). Operations 402-412 in the method 400 of FIG. 4 may be performed in the same or similar way as operations 202-212 in the method 200 of FIG. 2, and therefore are not described in detail herein. However, as previously described above, if the authorization codes from the cartridge to be refilled and the transfer container from which the refill product will be transferred do not agree, then product transfer from the transfer container to the cartridge will be disallowed.

The farmer completes activities using the cartridge 102 (FIG. 4, operation 414). The farmer may complete the application activities in any of a variety of ways and for any of a variety of reasons, all of which fall within the scope of the present invention. In other words, embodiments of the present invention are not limited to use in connection with planting equipment. Application apparatus may be equipped to various types of implements that are used to apply agricultural and/or horticultural inputs in conformity with the directions for use of the applied input, at any point preceding, during, or after the growing cycle for the plants associated with the applied product. Without limitation, RFID-tagged cartridges or product containers can be utilized according to the present invention by aircraft, drones, and golf course or turf application equipment. The farmer may, for example, complete applying the product 106 to the field, such as by applying all of the product 106 that is specified by a prescriptive map. In such a case, the cartridge 102 may or may not still contain some amount of the product 106. As another example, the cartridge 102 may completely deplete its store of the product 106, and the farmer may complete application activities in response to such depletion of the product 106. As yet another example, the amount of the product 106 in the cartridge 102 may fall below some threshold amount, in response to which the farmer may complete the application activities. The determination that the amount of the product 106 in the cartridge 102 has fallen below the minimum threshold amount may, for example, be determined manually by the farmer or automatically by an embodiment of the present invention, which may notify the farmer of such a determination and/or automatically prevent the product 106 from continuing to be dispensed from the cartridge 102 in response to determining that the amount of the product 106 in the cartridge 102 has fallen below the minimum threshold amount.

Regardless of how or why the farmer completes application activities, the farmer removes the cartridge 102 from the product dispensing assembly 302 (FIG. 4, operation 416) and provides the cartridge 102 to a retailer or other party capable of refilling the cartridge 102 (FIG. 4, operation 418). Note that it may not be necessary for the farmer to provide the cartridge 102 to another party in order to refill the cartridge 102. In certain embodiments of the present invention, for example, the farmer may refill the cartridge 102 himself. Operation 418, therefore, may be omitted from the method 400 in certain embodiments of the present invention. Therefore, references herein to "the retailer" in connection with the method 400 of FIG. 4 should be understood to refer to any party (including the farmer) who is capable of refilling the cartridge 102.

The retailer determines, using information on the tag 108 of the cartridge 102, any one or more of the following, in any combination (FIG. 4, operation 420):
  the unique identity of the cartridge 102, such as by reading the cartridge ID 122;
  the type of the product 106 that is or was contained in the cartridge 102 while the cartridge 102 was in use by the farmer, such as by reading the product type data 120;
  the amount of the product 106 that was contained in the cartridge 102 at the time the cartridge 102 was acquired by the farmer or last filled by the farmer, such as by reading the product quantity data 118;
  the amount of the product 106 that was dispensed from the cartridge 102 by the farmer since the cartridge 102 was acquired by the farmer or last filled by the farmer, such as by reading the product quantity data 118;
  the amount of the product 106 that currently is contained in the cartridge 102 (i.e., at the time of return of the cartridge 102 by the farmer), such as by reading the product quantity data 118;
  the unique identity of the farmer who owns or is a lessee of the cartridge, such as by reading farmer ID 130; and
  the unique identity of the retailer/supplier from whom the farmer purchased the cartridge, such as by reading retail ID data.

Operation 420 may include authenticating the cartridge 102, in the same or similar manner as authentication operation 212 in FIG. 2, so that only an authorized cartridge can be refilled. The present invention enables retailers to ensure that cartridges and remaining product therein are returned to the original site of purchase or other authorized vendor location. This facilitates automatic issuance of a credit invoice when a partially-filled cartridge is returned by the farmer or other authorized user.

Figure 5:
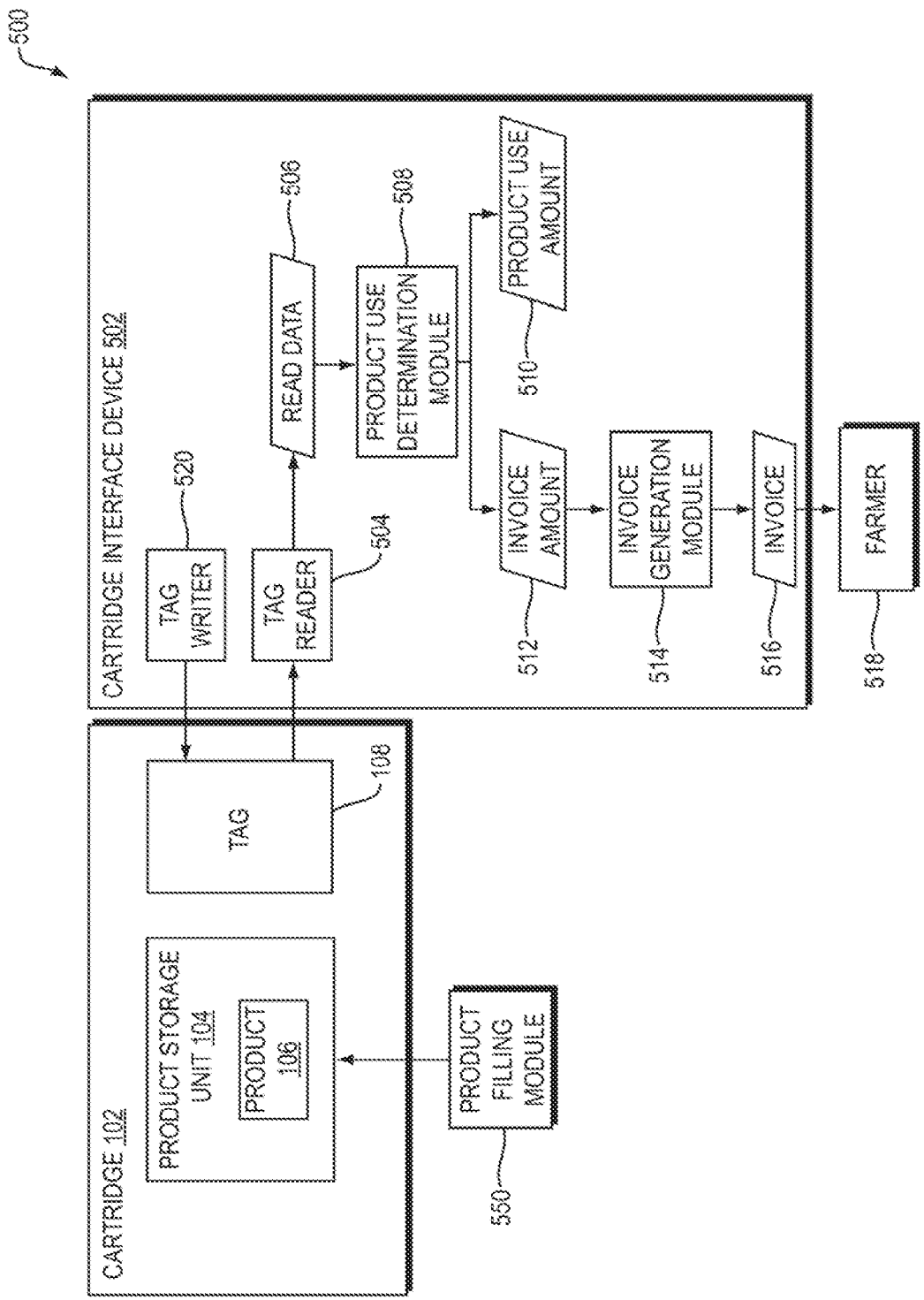
FIG. 5 is a diagram of a system for performing the method of FIG. 4 according to one embodiment of the present invention.

Referring to FIG. 5, a system 500 is shown which includes a tag reader 504, which may read automatically any of the data described above. Cartridge 102 of FIG. 1 is also illustrated in FIG. 5 with Product Storage Unit 104, Product 106 and Tag 108; in other constructions, other types of cartridges, tags and other components may be utilized according to the present invention. In some constructions, the tag reader 504 is an RFID tag reader which may read data from the tag 108 wirelessly. More generally, the tag reader 504 may use any appropriate techniques to read data from the tag 108 wirelessly and/or via wires. The tag reader 504 may be a component of a computing device 502 referred to herein as a cartridge interface device. The cartridge interface device 502 may control the tag reader 504 to read the data from the tag 108. Although the description above only refers to certain data being read from the tag 108, more generally the tag reader 504 may read any data from the tag 108.

The retailer invoices the farmer 518 for the amount of product 106 used by the farmer 518 from the cartridge 102 (FIG. 4, operation 422). This invoicing process may be performed in any of a variety of ways. For example, the cartridge interface device 502 may include a product use determination module 508. In general, the product use determination module 508 may determine the amount of product 106 that was used by the farmer 518 (e.g., the amount of product 106 that was dispensed from the cartridge 102 and/or the total area or rows in fields treated with the product) since the cartridge 102 was acquired by the farmer 518, since the cartridge 102 was last filled, or since the farmer 518 was last invoiced for use of the product 106 and/or cartridge 102. The present invention facilitates charging farmers and other authorized users for the value of plant protection and/or growth enhancement and/or product performance rather than charging only for total quantity of product dispensed regardless of effectiveness, which is particularly relevant when product dispensing is synchronized with seed delivery or plant placement by precision application equipment. The product use determination module 508 may produce an output signal representing this amount of the product 106 used, with as-applied data in some constructions and, in other constructions, without as-applied data.

The product use determination module 508 may produce the product use amount signal 510 in any of a variety of ways. For example, the tag reader 504 may produce, based on the data read by the tag reader 504 from the tag 108, a read data signal 506 representing some or all of the data read by the tag reader 504 from the tag 108. The read data signal 506 may, for example, represent all data read by the tag reader 504 from the tag 108. If the read data 506 already includes data representing an amount of the product 106 used by the farmer 518, then the product use determination module 508 may identify this amount in the read data signal 506 and output that amount in the product use amount signal 510. As another example, if the read data signal 506 includes data representing a previous amount of the product 106 in the cartridge 102 (e.g., the amount of the product 106 that was contained in the cartridge 102 when the farmer 518 previously obtained or filled the cartridge 102 with the product 106) and data representing the current amount of the product 1006 in the cartridge 102, then the product use determination module 508 may calculate the difference between these two amounts and output the resulting difference (e.g., current amount minus previous amount) in the product use amount signal 510.

The product use determination module 508 may calculate an invoice amount based on the identified amount of the product 106 used, in any of a variety of ways, and output an invoice amount signal 512 representing the calculated invoice amount. For example, the product use determination module 508 may identify a unit price of the product 106 (e.g., price per unit of volume, mass, length of rows treated, and/or areas of fields treated) and multiply the unit price by the amount (e.g., volume, mass, length or area) of product 106 used (represented by the product use amount signal 510) to produce a product representing the invoice amount, which the product use determination module 508 may include in the invoice amount signal 512.

The product use determination module 508 may identify the unit price of the product 106 in any of a variety of ways. For example, the product use determination module 508 may identify the type of the product 106, such as by identifying the type of the product 106 based on the product type data 120, as read by the tag reader 504 from the tag 108 and included in the read data 506. The product use determination module 508 may identify the unit price of the product 106 based on the type of the product 106, such as using the product type to look up a corresponding unit price in a mapping (e.g., database table) of product types to unit prices.

As another example, the invoice amount signal 512 may represent a refund amount due to the farmer 518, rather than an amount owed by the farmer 518. The product use determination module 508 may calculate such a refund amount due in any of a variety of ways. For example, the product use determination module 508 may identify an amount previously paid by the farmer 518 for the product 106 in the cartridge 102, such as the amount paid by the farmer 518 for the product 106 upon previous receipt (e.g., initial purchase) of the cartridge 102 by the farmer 518 or upon previous filling of the cartridge 102 with the product 106. The product use determination module 508 may identify an amount of the product 106 used by the farmer 518 from the cartridge 102 since the time associated with the previous payment by the farmer 518, using any of the techniques disclosed herein. The product use determination module 508 may identify a price of the used amount of the product 106, using any of the techniques disclosed herein. The product use determination module 508 may identify a difference between the previous payment by the farmer 518 and the price of the used amount of the product 106, such as by subtracting the price of the used amount of the product 106 from the previous payment by the farmer 518. The product use determination module 508 may identify this difference as the refund amount due to the farmer 518, and may include data representing this refund amount due in the invoice amount 512.

An invoice generation module 514 generates an invoice 516 based on the invoice amount 512. The invoice 516 may include data representing the invoice amount 512, which may be positive (in the case of an amount owed by the farmer 518) or negative (in the case of an amount (refund) owed to the farmer 518). The system 500 may deliver the invoice 516 to the farmer 518 in any manner, such as by transmitting the invoice 516 in electronic form, on paper, or both. The process of providing the invoice 516 to the farmer 518 may include automatically or semi-automatically (e.g., upon approval by the farmer 518) obtaining payment from the farmer 518 for the amount due or providing a refund to the farmer 518 for the amount owed to the farmer 518.

The system 500 may include a product filling module 550, which may be the same as or similar to the product filling module 150 of FIG. 1. The product filling module 550 (which in some constructions is part of the cartridge interface device 502) may fill the cartridge 102 with the product 106, such as by using any of the techniques disclosed above in connection with the filling of the cartridge 102 in FIG. 1 (FIG. 4, operation 424). The product filling module 550 may receive some or all of the read data 506 and/or product use amount 510 as inputs, and may identify an amount of the product 106 with which to fill the cartridge 102, and then fill the cartridge 102 with the identified amount of the product 106. The product filling module 550 may identify the amount of the product 106 with which to fill the cartridge 102 in any of a variety of ways. For example, the product filling module 550 may fill the cartridge 102 with the amount of the product 106 that was previously used by the farmer 518, as represented by the product use amount 510. As another example, the product filling module 550 may identify, based on the read data 506, the maximum amount of the product 106 that can be added to the product storage unit 104 in order to make the product storage unit 104 full of the product 106, and then fill the product storage unit 104 with that amount of the product 106. As yet another example, the product filling module 550 may fill the cartridge 102 with the amount of the product 106 that the farmer 518 has paid for. For example, the farmer 518 may pay the invoice 516 and, in response to this payment, the product filling module 550 may identify the amount of the product 106 for which the farmer 518 has paid, and then fill the cartridge 102 with the identified amount of the product 106. Note that the product storage unit 104 may or may not be full of the product 106 after the product filling module 550 has filled the product storage unit 104. The product storage unit 104 may, in other words, contain some empty space after the product filling module 550 has filled the product storage unit 104.

Before filling the cartridge 102, the method 400, FIG. 4, may determine whether an attempt is being made to fill the cartridge 102 with a different product than the product 106 that was previously contained or still is contained in the cartridge 102. If the method 400 confirms that an attempt is being made to fill the cartridge 102 with the same product as was previously contained in, or still is contained in, the cartridge 102, then the method 400 permits the cartridge 102 to be refilled with the product 106. If the method 400 determines that an attempt is being made to fill the cartridge 102 with a different product than the product 106 that was previously contained or still is contained in the cartridge 102, then the method 400 prohibits the cartridge 102 from being filled, such as by preventing a valve in the port 152 from opening. If the cartridge 102 is to be refilled with a different product, then the method 400 requires that the tag 108 be removed from the cartridge 102, that the cartridge 102 be washed (e.g., triple-rinsed), and that a new tag be affixed to the cartridge 102 before the cartridge 102 is refilled. In general, the method 400 confirms that the type of product to be added to the cartridge 102 matches the type specified by the product type data 120 on the tag 108 before permitting the product to be added to the cartridge 102.

The system 500 also includes a tag writer 520, which updates data stored on the tag 108 to reflect, for example, any one or more of the following, in any combination (FIG. 4, operation 426):

- the type of product 106 contained in the cartridge 102 after the cartridge 102 has been filled by the product filling module 550;
- the amount of the product 106 contained in the cartridge 102 after the cartridge 102 has been filled by the product filling module 550;
- the date and/or time at which the product filling module 550 filled the cartridge 102 with the product 106;
- the manufacturing lot number for the product 106 with which the cartridge 102 is filled;
- for dry products, the bulk density of the product 106 with which the cartridge 102 is filled;
- for liquid products, the liquid viscosity of the product 106 with which the cartridge 102 is filled;
- the location at which the cartridge 102 was filled with the product 106 by the product filling module 550 (e.g., the location of the cartridge interface device 502);
- the identity of the retailer who refilled the cartridge 102 using the product filling module 550;
- the price that the retailer should charge the farmer 518 for the contents of the cartridge 102;
- the price paid by the farmer 518 for the amount of the product 106 added to the cartridge 102 by the product filling module 550;
- the identity of the farmer 518; and
- the identity of the retailer that sold the cartridge and/or product therein to the farmer.

The cartridge 102 is then available for use (possibly re-use) by the farmer 518 or another farmer (FIG. 4, operation 428). The farmer 518 may, for example, take the cartridge 102 and reinsert it into one of the receptacles 304a-h in the product dispensing assembly 302 of FIG. 3 and then use the cartridge 102 again to dispense the product 106 in the manner disclosed above in connection with FIGS. 1-3.

The method 400 of FIG. 4 and system 500 of FIG. 5 have a variety of benefits. For example, the method 400 and system 500 may automatically calculate the amount of the product 106 that was used by the farmer 518 from the cartridge 102 and/or the amount of the product 106 remaining in the cartridge 102. The ability to calculate such amounts automatically, based on data stored in and read from the tag 108 automatically (e.g., without manual input from the retailer or farmer 518), both increases the speed at which such calculations may be performed and reduces or eliminates the human error (both intentional and unintentional) that can result from performing such calculations manually. The method 400 and system 500 may perform such calculations automatically to reflect the type of the product 106 and its associated unit price. In fact, in existing systems, no attempt typically is made to make such calculations at all. Instead, returned cartridges are simply emptied, cleaned, and completely refilled, and the farmer is charged for the price of a full cartridge.

One benefit of calculating the amount of the product 106 that was actually used by the farmer 518 is that the farmer 518 may be charged only for the amount of the product 106 that the farmer 518 actually used. In order to comply with custody exchange laws, this may be done, for example, by weighing the cartridge 102, instead of or in addition to using data from the cartridge tag 108. Regardless of how the amount of product actually used is calculated, charging the farmer 518 only for the amount of the product 106 that the farmer 518 actually used may both reduce the cost of each cartridge use for the farmer 518 and encourage the farmer 518 to use the cartridge 102 because of the knowledge that the price the farmer 518 will pay for the cartridge 102 will be limited by the amount of the product 106 that the farmer 518 actually uses.

The weight of the cartridge 102 upon its return by the farmer 518 may be used for a variety of purposes. For example, in one embodiment of the present invention, the cartridge 102 may be weighed upon being returned by the farmer 518 to determine the actual weight of the cartridge 102 at that time. Various as-applied data, such as the weight of the cartridge 102 when it was previously obtained by the farmer 518, the bulk density and/or liquid viscosity of the product 106 in the cartridge 102, the application rate(s) of the cartridge 102 while it was in use by the farmer 518, and the speed over ground of the product dispensing assembly 302 while it was dispensing the product 106 from the cartridge 102 (also referred to herein as application equipment speed), may be read automatically from the tag 108 and used to calculate the expected weight of the cartridge 102 at its time of return by the farmer 518. The actual and expected weights of the cartridge 102 may be compared to each other to identify any disparity between the two. Any such disparity may be used for any of a variety of purposes, such as calibration and/or invoicing. In other words, in one construction of the present invention, a closed-loop self-calibrating dispensing and invoicing system is achieved.

Another benefit of the method 400 and system 500 is that they enable the cartridge 102 to be refilled and reused without first needing to rinse it before refilling it. This is a significant advantage because, for example, in the U.S. the Environmental Protection Agency (EPA) requires pesticide-filled cartridges to be triple-rinsed before disposal. In existing systems, cartridges are typically disposed of by farmers after each use. As a result, each cartridge typically is triple-rinsed after each use. Triple-rinsing is a tedious and time-consuming process, as is the process of disposing of the containers after they've been triple-rinsed. Unless the containers are recycled, an option which is not uniformly available in all areas, the triple-rinsed containers end up in a landfill or are incinerated. The method 400 and system 500 of FIGS. 4 and 5 enable the cartridge 102 to be refilled with the product 106 without triple-rinsing the cartridge 102, thereby saving the significant time and cost associated with triple-rinsing and cartridge disposal.

As described above, the farmer 518 may remove some or all of the cartridges from the product dispensing assembly 302 of FIG. 3 and bring some or all of those cartridges to the retailer for refilling. As a result, the method 400 and system 500 may be applied to each of a plurality of the farmer 518's cartridges, such as cartridges in receptacles 304a-h, FIG. 3. The ability of the method 400 and system 500 to automatically identify the amount of product used within each cartridge is particularly beneficial when the farmer 518 brings a plurality of cartridges to the retailer for refilling. This is because multiple cartridges installed simultaneously in the product dispensing assembly 302 may dispense their respective products at different rates, and thereby deplete their respective product storage units at different rates, for a variety of reasons, such as differences in rates specified by the prescriptive map applied by the system 300. As a result, one or more of the cartridges in the product dispensing assembly 302 may become empty or otherwise require refilling before other cartridges in the same product dispensing assembly. It can be extremely time-consuming and costly for the farmer 518 to stop the tractor/planter to which the product dispensing assembly is attached for the purpose of removing and replacing only a single cartridge. For example, it has been estimated that a farmer may lose $5,000/hour in lost yield and efficiency when a 24-row planter is stopped during peak planting season. In contrast, embodiments of the present invention enable the farmer 518 to remove all cartridges from the product dispensing assembly 302 in response to determining that even one of the cartridges in the product dispensing assembly 302 requires or would benefit from refilling, even if other cartridges in the same product dispensing assembly 302 do not yet require refilling or otherwise contain more product than the cartridge requiring refilling. This facilitates the cartridge exchange process by enabling all the cartridges to be replaced when the planter has to be stopped to refill with seed, eliminating the expensive alternative of additional planter stoppages just to replace product cartridges. The farmer 518 may then bring all of the cartridges to the retailer in one visit and be assured that he will pay only for the amounts that were actually dispensed from each cartridge. Such refilling may use the method 400 and system 500 to automatically refill each such cartridge only with the amount required to fill that cartridge with its respective product, and to charge the farmer 518 only for the amount of product filled in each cartridge, even if the amount filled varies from cartridge to cartridge. The farmer 518 thereby benefits from avoiding the need to stop the application equipment to refill each individual cartridge when it becomes empty, by instead removing and replacing all cartridges with full cartridges whenever one cartridge needs replacing, thereby reducing the amount of time during which the application equipment is stopped, while only paying for the actual amounts of product used from each cartridge (rather than, for example, paying the full cost of full cartridges).

In any of the examples disclosed herein, the refilled cartridge that the farmer receives at the end of the method 400 need not be the same cartridge that the farmer 518 brought to be refilled at the beginning of the method 400. Instead, for example, the farmer 518 may bring one cartridge to the retailer in operation 418 of the method 400, in response to which the method 400 may calculate the amount of the product 106 used by the farmer 518 and bill the farmer 518 accordingly, in the manner described above in connection with FIGS. 4 and 5. The method 400 and system 500 may even refill the cartridge returned by the farmer 518 in the manner described above in connection with FIGS. 4 and 5. The retailer may, however, provide to the farmer a different, full, cartridge, instead of the cartridge that the farmer 518 returned to the retailer. The net effect is the same as if the retailer had refilled the cartridge returned by the farmer 518 and provided the refilled cartridge to the farmer 518: the farmer 518 receives back a full cartridge and pays only for the difference between the amount of the product that was in the cartridge returned by the farmer 518 to the retailer and the amount of the product in the full cartridge. It may be beneficial, however, to provide a different full cartridge to the farmer 518, rather than to provide the same but refilled cartridge to the farmer 518, because doing so may be faster and more efficient, both for the retailer and the farmer 518. The retailer may, for example, wait until a subsequent time to refill the returned cartridge, such as at a time when the retailer refills a plurality of cartridges with the same product in a batch, which may be more efficient for the retailer than refilling individual cartridges on-demand as they are returned by individual farmers for refilling.

As described above, the cartridge 102 may dispense the product 106 in quantities that are determined by a prescriptive map which specifies the rate at which the product 106 is to be dispensed at different geographic locations within the field. More generally, the prescriptive map may indicate, for each of a plurality of locations in the field, and for each of a plurality of products, the rate at which each such product is to be dispensed at each such location. Any such rate may be equal to zero, thereby indicating that the corresponding product is not to be dispensed at all in the corresponding location in the field.

The rate at which a product is dispensed at any particular location in the field may vary from the ideal rate specified by the prescriptive map. As a result, the amount of the product that is dispensed at that location may vary from the desired amount. Such disparities between the prescribed rate and the actual rate may result from any of a variety of causes, such as miscalibration of the meter that dispenses the product or irregularities in the topographical features of the field.

Figure 6:
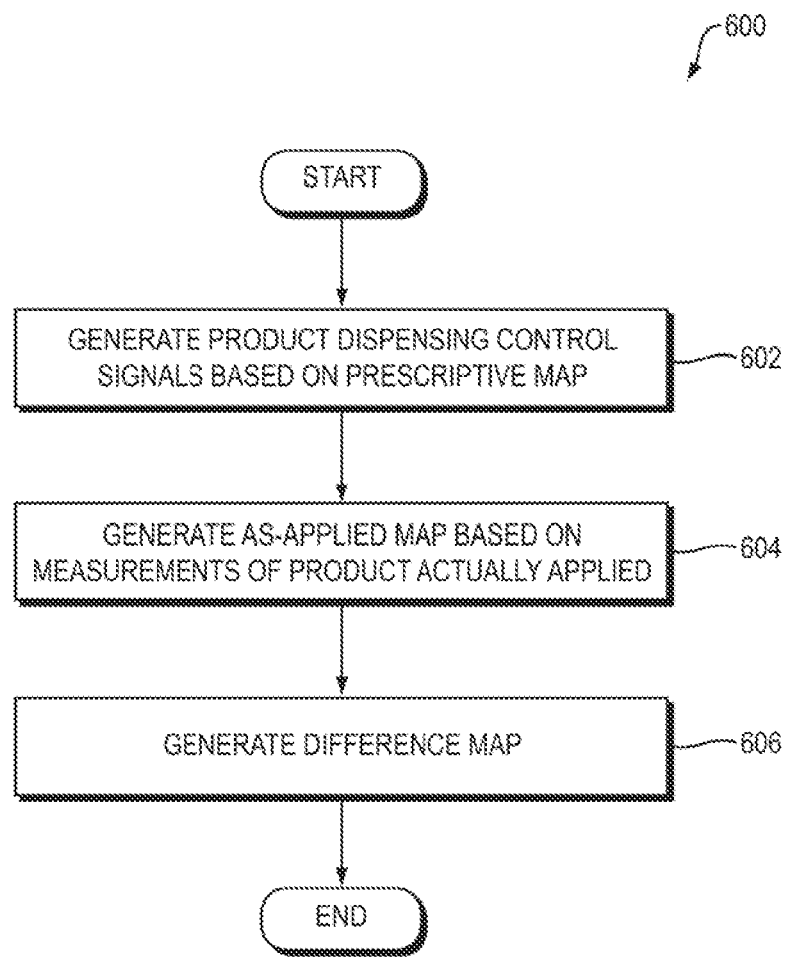
FIG. 6 is a flowchart of a method for determining whether the prescribed amount of product dispensed from the tagged cartridge of FIG. 1 in a field differs from the actual "as-applied" amount of product dispensed from the cartridge according to one embodiment of the present invention.
Figure 7:
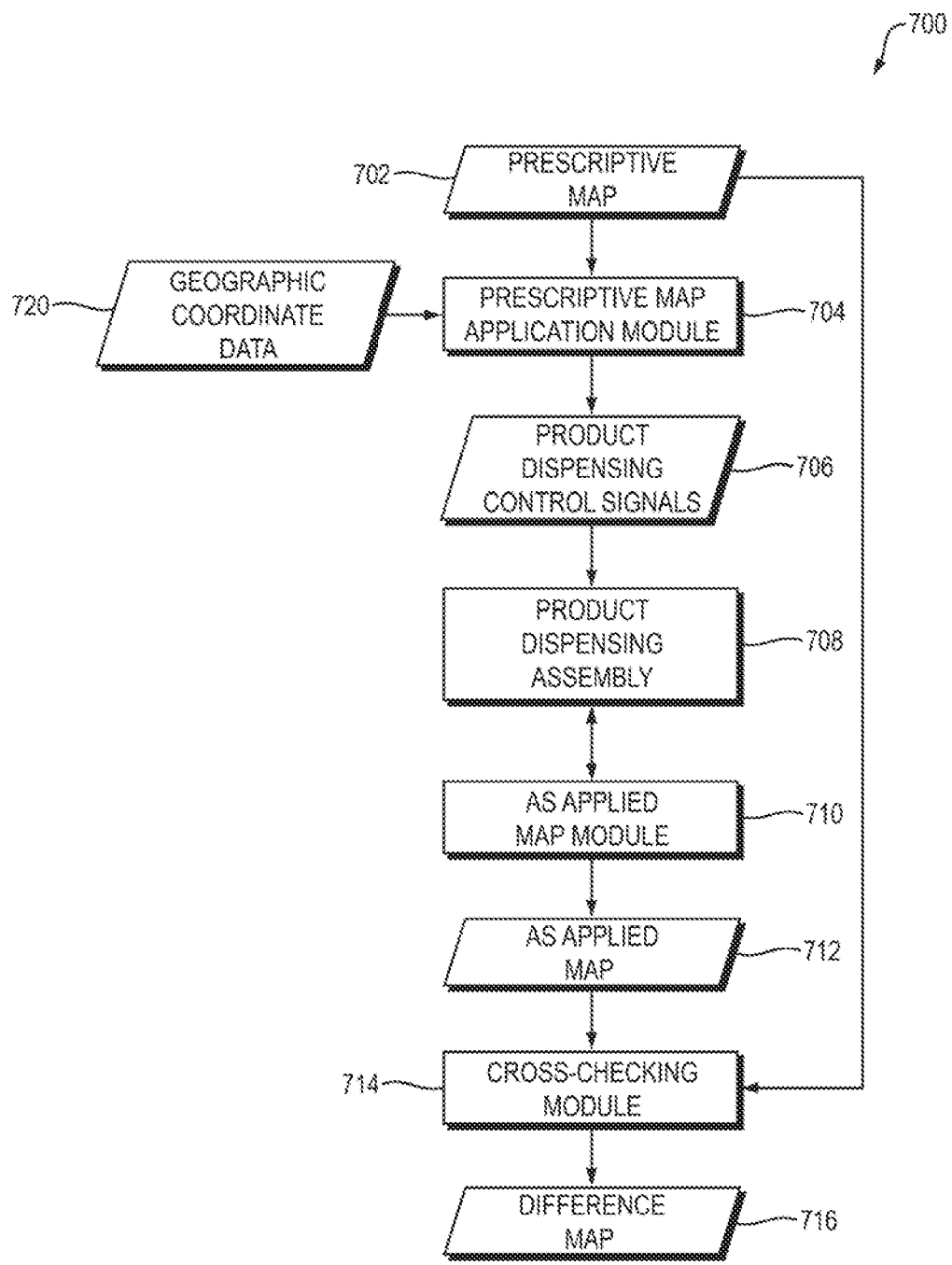
FIG. 7 is a dataflow diagram of a system for performing the method of FIG. 6 according to one embodiment of the present invention.

Embodiments of the present invention may be used to determine whether the prescribed amount of product dispensed by one or more meters in the field differs from the actual amount of product dispensed by those meters, and other embodiments of the present invention may be used to determine whether the prescribed amount of product dispensed by one or more meters at one or more locations in the field differs from the actual amount of product dispensed at those locations. Referring to FIG. 6, a flowchart is shown of a method 600 for making such a determination according to one embodiment of the present invention, as discussed in more detail below. Referring to FIG. 7, a dataflow diagram is shown of a system 700 for performing the method 600 of FIG. 6 according to one embodiment of the present invention.

The system 700 includes a prescriptive map 702. The prescriptive map 702 may be stored in digital form and may contain data representing any of the information described herein as being part of a prescriptive map. A schematic illustration of a prescriptive map 1100 is shown in FIG. 11, with discrete values shown in key 1102 as described in more detail below. In general, the prescriptive maps 702 and/or 1100 may, for example, contain data representing, for each of a plurality of locations in a field, and for each of a plurality of products (e.g., product types), the rate at which to apply each of the plurality of products (or the amount of the product to apply) within each of the plurality of locations.

The system 700 also includes a prescriptive map application module 704. In general, the prescriptive map application module 704 receives the prescriptive map 702 and/or map 1100 as an input, and uses the data in the prescriptive map application module 704 and/or map 1100 to generate and output product dispensing control signals 706 to the product dispensing assembly 302 of FIG. 3, which is shown only in block form in FIG. 7 and in more detail in FIG. 3 (FIG. 6, operation 602). The product dispensing control signals 706 indicate, for each of the meters 306a-h in the product dispensing assembly 302, the rate at which to dispense the corresponding product at the current time. For example, the product dispensing control signals 706 may include a signal that is provided to the meter 306a and which indicates that the meter 306a is to dispense the product that is contained in the cartridge in receptacle 304a at a specified rate. In response, the meter 306a attempts to dispense its product at the rate specified by the received product dispensing control signal. As described above, however, the actual rate at which the meter 306a dispenses the corresponding product may or may not be the same as the rate specified by the control signal received by the meter 306a.

The prescriptive map application module 704 may generate the product dispensing control signals 706 in any of a variety of ways. For example, the prescriptive map application module 704 may identify the current location of the product dispensing assembly 302, and generate the product dispensing control signals 706 based on the prescriptive map 702 and the current location of the product dispensing assembly 302. For example, the prescriptive map application module 704 may identify the product rates in the prescriptive map 702 that correspond to the current location of the product dispensing assembly 302, and generate the product dispensing control signals 706 to indicate that the identified product rates are to be output by the meters 306a-h in the product dispensing assembly 708. The prescriptive map application module 704 may, for each identified product rate in the prescriptive map, identify the type of product associated with that product rate, identify the meter in the product dispensing assembly 302 that is coupled to a cartridge containing that type of product, and direct the corresponding product dispensing control signal to the identified meter.

The prescriptive map application module 704 may identify the current location of the product dispensing assembly in any of a variety of ways. For example, the prescriptive map application module 704 may receive geographic coordinate data 720 specifying a current location (e.g., geographic coordinates, also referred to herein as "geographic locations" or "geolocations") of the product dispensing assembly 302. The geographic coordinate data 720 may be generated automatically using, for example, a Global Positioning System (GPS) module that is located in, on, or near the product dispensing assembly 302 and which automatically identifies the current location of the product dispensing assembly 302 and which generates the geographic coordinate data 720 to represent the current location of the product dispensing assembly 302. As described above, the GPS data can be augmented with Real Time Kinematic (RTK) positioning techniques to achieve sub-centimeter-level location accuracy.

The system 700 also includes an as-applied map module 710, which detects the actual amounts of product dispensed by the meters 306a-h in the product dispensing assembly 302, and which generates an as-applied map 712 representing those amounts (FIG. 6, operation 604). A schematic illustration of an as-applied map 1000 is provided in FIG. 10, with values shown in key 1002. The as-applied map module 710 may, for example, use any of the techniques disclosed above in connection with the method 200 and system 300 of FIGS. 2 and 3, respectively, to generate the as-applied map. For example, each of the meters 306a-h may contain a processor and memory that record the amount of product being dispensed at each of a plurality of points in time. Such amounts may be stored in the respective tag for each cartridge and/or transmitted to and stored in the measurement data 334. The measurement data 334 may include the as-applied map 712 or map 1000, and/or be used to generate the as-applied map 712 or map 1000. In general, the as-applied map 712 and/or map 1000 contains data, for each of a plurality of locations in the field and for each of a plurality of products, the amount of each of the products that was actually dispensed (as represented by the measurements taken by the meters 306a-h) at each of the plurality of locations in the field. The structure of the as-applied map 712 may, therefore, be the same as or similar to the structure of the prescriptive map 702, and the structure of as-applied map 1000 may be the same or similar to that of prescriptive map 1100. For each field location and product, the prescriptive map 702 indicates the amount of product that is intended to be dispensed at the field location, such as a linear location along a furrow or at a latitude-longitude location, whereas the as-applied map 712 indicates the amount of product that actually was dispensed at that same field location. Similarly, each region shown in FIG. 11 for prescriptive map 1100 designates the geolocation and prescribed amount (as listed in key 1102, such as one of 28.0 units through 34.0 units of a product for that geolocation), whereas the individual "bars" or rounded rectangles of as-applied map 1000, FIG. 10, correspond to ranges of measured as-applied amounts, having values as designated in key 1002, along neighboring furrows in a field. The present invention is highly compatible with precision agriculture techniques including synchronized seed and product delivery such as described in one or more of U.S. Pat. No. 7,270,065 and U.S. Patent Application Pub. No. 2017/0000022 by Larry M. Conrad, and U.S. Pat. No. 6,938,564, U.S. Patent Application Pub. Nos. 2018/0014456 and 2018/0092296 by Conrad et al., for example. Although rows of rounded rectangles of as-applied values are shown in FIG. 10 for ease of illustration, it will be appreciated by those of ordinary skill after reviewing the present application that discrete as-applied amounts can be measured, recorded, and/or depicted in as-applied map 712 and/or map 1000, and/or in tabular format, in whatever resolution is desired, subject only to the accuracy of product delivery amount measurements by geolocation for particular delivery equipment.

The system 700 also includes a cross-checking module 714. The cross-checking module 714 receives the prescriptive map 702 (such as prescriptive data represented by prescriptive map 1100, FIG. 11) and the as-applied map 712 (such as as-applied data represented by as-applied map 1000, FIG. 10) as inputs and compares the two maps 702 and 712 to generate a difference map 716 (FIG. 6, operation 606). The cross-checking module 714 may, for example, for each location-product pair in the prescriptive map 702 and the as-applied map 712, subtract the product rate (or amount) in the as-applied map 712 from the corresponding product rate (or amount) in the prescriptive map 702 and store the resulting difference in association with the location-product pair in the difference map 716. As a result, the difference map 716 may include data indicating, for each location-product pair, the difference (which may be zero) between the rate at which the product actually was applied (or the amount of product that was applied) in the field and the rate at which the product was intended to be applied (or the amount of product that was intended to be applied) at that location. It will be appreciated that as-applied data represented by as-applied map 1000, FIG. 10, can be more precise than the ranges of values listed in key 1002 and by the groupings illustrated within map 1000. It will also be appreciated that the listed ranges can be configured by a user as desired, such as by selecting more ranges or fewer ranges to depict in as-applied map 1000, or by selecting different numerical increments for each range, which overlap slightly in some constructions and, in other constructions, do not overlap. It will be further appreciated that a differences map created by overlaying (or otherwise combining) an as-applied map such as map 1000 with a prescriptive map such as map 1100 can show non-zero differences with different colors or other visually-perceptible and/or machine-perceptible indicia.

Although the elements of the system 700 of FIG. 7 are shown as independent elements, any of these elements may be combined with each other or divided into additional elements. Furthermore, any of the elements of FIG. 7 may be integrated into the system 300 of FIG. 3 in a variety of ways. For example, the prescriptive map application module 704 may be part of the product dispensing assembly 302. As another example, the as-applied map module 710 may be part of the meters 306*a-h*. In some constructions, portions of the difference map 716 are utilized to generate warnings or error messages to a farmer or other user via I/O Device 336, FIG. 3. For example, differences greater than a pre-selected percentage, such as errors greater than two percent or three percent of prescribed product application, can trigger a warning light or error message to be displayed to the farmer.

Although the description above may refer to "rates" and "amounts" separately, it should be understood that any rate may alternatively be represented as an amount or converted to an amount, and vice versa. Therefore, any reference herein to a rate should be understood as applying equally to an amount, and that any reference herein to an amount should be understood as applying equally to a rate.

Although the method 600 and system 700 of FIGS. 6 and 7 are described above as comparing data associated with geospatial coordinates, this is merely an example and not a requirement of the present invention. More generally, the method 600 and system 700 may monitor the actual amounts of product dispensed by particular meters in the field and compare those actual amounts to the amounts of product prescribed by the as-applied map 712. The method 600 and system 700 may compare such amounts to each other, with or without reference to geospatial coordinates, to identify any differences between the prescribed amounts of products to be applied to the field and the actual amounts of product applied to the field by the meters. For example, the method 600 and system 700 may, for each meter, compare the total amount of product actually applied by that meter in the field to the total amount of product prescribed by the prescriptive map 702 to be applied by that meter in the field to generate the difference map 716, which may contain the resulting differences for each of the meters, without any associated geospatial coordinates.

The method 600 and system 700 of FIGS. 6 and 7 have a variety of advantages. For example, if any of the products dispensed by the product dispensing assembly 302 are believed to have delivered less than satisfactory performance in a particular location, the difference map 716 may be used to determine whether the actual amount of the product dispensed in that location differed from the prescribed amount. This information can be extremely useful in diagnosing the cause of the performance problem. For example, if it is determined, based on the difference map 716, that there was no (or negligible) difference between the prescribed and applied amount of the product, then such a difference may be ruled out as a cause of the problem.

As described above, the cartridge 102 may change hands over time. Such changes may include, for example, any one or more of the following in any combination: changes in ownership, changes in rights of control (e.g. as specified by licenses and/or leases), changes in custody, and other changes in possession. Any such change in possession is referred to as a "touch" for ease of explanation herein, and can be tracked through entity possession data according to one aspect of the present invention. Chain-of-custody levels of traceability can be achieved. For example, as described above in connection with the refilling of the cartridge 102 in the method 400 of FIG. 4 and the system 500 of FIG. 5, a farmer may be in possession of the cartridge 102 at one time; the farmer may then give possession of the cartridge 102 to a retailer at a later time for refilling; and the retailer may then provide the cartridge 102 back to the farmer at yet a later time after the cartridge 102 has been refilled. In this example, possession of the cartridges changes from the farmer to the retailer and then again to the farmer over time. Each of these changes in possession is an example of a "touch," as that term is used herein, which can be stored as entity possession data.

Embodiments of the present invention may be used to track any such touches over time, and to store information describing such touches, such as entity possession data, in the cartridge tag 108 itself and/or in the measurement data 334, FIG. 3, maintained by the server 332. In some constructions, the cartridge memory 110, FIG. 1, includes touch history data 126, also referred to herein as entity possession data. The touch history data 126 may include, for each of one or more touches, data representing that touch, such as any one or more of the following:

the time of the touch;
the location of the touch;
the type of touch (e.g., change in ownership, rights, or other types of possession);
the entity (if applicable), e.g., person or organization, from whom ownership, rights, or possession in the cartridge 102 was transferred;
the entity (if applicable), e.g., person or organization, to whom ownership, rights, or possession in the cartridge 102 was transferred; and
the purpose of the touch (e.g., purchase of the cartridge 102, refilling the cartridge 102, returning the cartridge 102).

Any data representing an entity in the touch history data 126 may represent that entity in any of a variety of ways, such as by real name, username, unique identifier, or any combination thereof.

Because the touch history data 126 may include such data for a plurality of touches, the touch history data 126 may include data representing a history of touches of the cartridge 102, such as a history of changes in ownership, control, and/or possession of the cartridge 102 over time.

Examples of times at which the touch history data 126 may be updated include:

acquiring of the cartridge 102 by the farmer in operation 206 of the method 200 of FIG. 2 or in operation 406 of the method 400 of FIG. 4;
acquiring of the cartridge 102 by the retailer in operation 418 of the method 400 of FIG. 4; and
returning of the cartridge 102 by the retailer to the farmer in operation 428 of the method 400 of FIG. 4.

The ability to perform touch tracking enables embodiments of the present invention to perform a variety of other functions. For example, embodiments of the present invention may use the touch history data 126 to control and/or prohibit "sideways" transfer of the cartridge 102 in a distribution channel. An example of a sideways transfer, as that term is used herein, is the transfer of possession, ownership, or control in the cartridge 102 from one retailer to another retailer, rather than from a retailer to a farmer (which would constitute a "downward" transfer rather than a sideways transfer). Another example of a sideways transfer is the transfer of possession, ownership, or control in the cartridge 102 from one farmer to another farmer or to a dealer. One aspect of the present invention is to designate, for each cartridge, a specific user for specific product placed into that cartridge. In some constructions, the authorized specific user will be both a farmer responsible for one or more fields, and an approved operator of dispensing equipment acting on behalf of the responsible farmer as an approved current user. One technique for designating cartridges to be used by or on behalf of a specific user for specific product is to generate and/or store authorization codes for such approved users in a RFID tag attached to each cartridge.

Although contracts may be used to prohibit sideways transfers to a certain extent, contracts have limitations. To address this problem, embodiments of the present invention may use technological means to control or prohibit sideways transfers of the cartridge 102. For example, as described above, the cartridge 102 may include a cartridge ID 122, which may be validated to determine whether the cartridge ID 122 is permitted to dispense its product 106. In addition, the cartridge tag 108 may contain a license ID (not shown), representing or otherwise corresponding to a license that authorizes the farmer to use the cartridge 102 in connection with a particular product dispensing assembly, such as the product dispensing assembly 302 of FIG. 3. In other words, a particular license may be associated with both the product dispensing assembly 302 and the cartridge 102, thereby linking the use of the cartridge 102 to the product dispensing assembly 302. The product dispensing assembly 302 may store the same license ID as the cartridge 102 or otherwise be configured to be associated that that license ID. Before the product dispensing assembly 302 dispenses the product 106 from the cartridge 102, the product dispensing assembly 302 may determine whether the cartridge tag 108 contains the license ID that is associated with the product dispensing assembly 302, and then permit the cartridge 102 to dispense the product 106 only if the cartridge 102 contains that license ID (and prohibit the cartridge 102 from dispensing the product 106 otherwise).

As a result, if someone attempts to dispense the product 106 from a product dispensing assembly that does not contain (or otherwise is configured to recognize) the corresponding license ID on the cartridge 102, then that product dispensing assembly will not be able to dispense the product 106 from the cartridge. This feature may be used to prohibit sideways transfers from being effective, because even if one party transfer the cartridge 102 sideways to another party, the receiving party will not be able to dispense the product 106 from the cartridge 102 because the receiving party's product dispensing assembly will not authorize the cartridge 102 for use.

Another feature that is enabled by the cartridge ID 122 is the ability to prohibit the cartridge 102 from being used after the quantity of the product 106 in the cartridge 102 diminishes to less than some predetermined threshold. More specifically, as described above, after the cartridge 102 has been validated (such as in operation 212 of the method 200 of FIG. 2), the cartridge 102 may be used to dispense the product 106 in any of the ways disclosed herein. As the product 106 is dispensed from the cartridge 102, the changing quantity of the product 106 in the cartridge 102 may be tracked and updated on the cartridge tag 108, as disclosed above in connection with FIGS. 1-3. The system 300 may repeatedly determine (by reference to the product quantity data 118) whether the amount of the product 106 in the cartridge 102 has become equal to or less than some predetermined threshold (the value of which may itself be stored in the tag 108). The predetermined threshold may be any value, and in particular may be equal to or close to zero. If the system 300 determines that the quantity of the product 106 in the cartridge 102 has become equal to or less than the predetermined threshold, then the system 300 may disable the cartridge 102 from further use, such as by storing data (not shown) in the cartridge memory 110 indicating that the cartridge 102 has been disabled.

Any attempt to use or validate the cartridge 102 while the cartridge 102 in in this disabled state will fail. The validation process (operation 212 in FIG. 2) may, for example, determine whether the cartridge 102 is in a disabled state and may not validate the cartridge 102 in response to determining that the cartridge 102 is in a disabled state.

If the cartridge 102 in a disabled state, the cartridge 102 may be enabled for further use only by an authorized refiller of the cartridge 102, such as in operation 202 in FIG. 2, operation 402 in FIG. 4, or operation 424 in FIG. 4. For example, in some embodiments of the present invention, once the tag 108 has been put in a disabled state, it is no longer possible to put the tag 108 into an enabled state. In other words, disabling the tag 108 may be an irreversible operation. In such embodiments, to re-enable the cartridge 102 it is necessary to install a new tag, which is in an enabled state, on the cartridge 102. As a result, an attempt to validate the cartridge 102 (such as in operation 212 in FIG. 2) will succeed, because the cartridge 102's new tag will be determined to be in an enabled state, and the cartridge 102 will be usable for dispensing product. In other embodiments, it may be possible to change the state of the tag 108 from disabled to enabled, but only certain parties, such as authorized resellers, may be capable of changing the state of the tag 108 from disabled to enabled. An advantage of disabling the cartridge 102 for use after the quantity of the product has fallen below the predetermined threshold is that doing so prevents the cartridge 102 from being used to apply an unauthorized product that has been inserted into the cartridge 102 using an unauthorized refilling process.

Another problem with existing agricultural product application systems is that application accuracy may vary over time for a variety of reasons. For example, granular products are packaged and labeled for application by weight, but the devices that meter such products do so based on product volume rather than weight. Consequently, when the bulk density of a product changes, the metered weight of the product changes for a given volume of the product which moves through the meter. Different manufacturing batches or lot numbers of the same granular product may have different bulk densities. In order to achieve optimum application accuracy, granular application meters should be recalibrated each time a product with a different bulk density is dispensed through the meter. Performing such recalibration, however, is tedious and time-consuming. A similar problem occurs when the liquid viscosity of a liquid product changes, creating a similar need to recalibrate.

Embodiments of the present invention may use product bulk density information in the cartridge tag 108 to automatically recalibrate a meter when a cartridge is coupled to the meter. Such embodiments may, for example, automatically select a specific calibration algorithm to use to recalibrate the meter, and then automatically recalibrate the meter using the selected algorithm. Such embodiments may select a specific calibration algorithm from among a plurality of calibration algorithms, each of which corresponds to a particular bulk density. Any reference herein to bulk density of a granular product should be understood to be equally applicable to the liquid viscosity of a liquid product.

Figure 8:
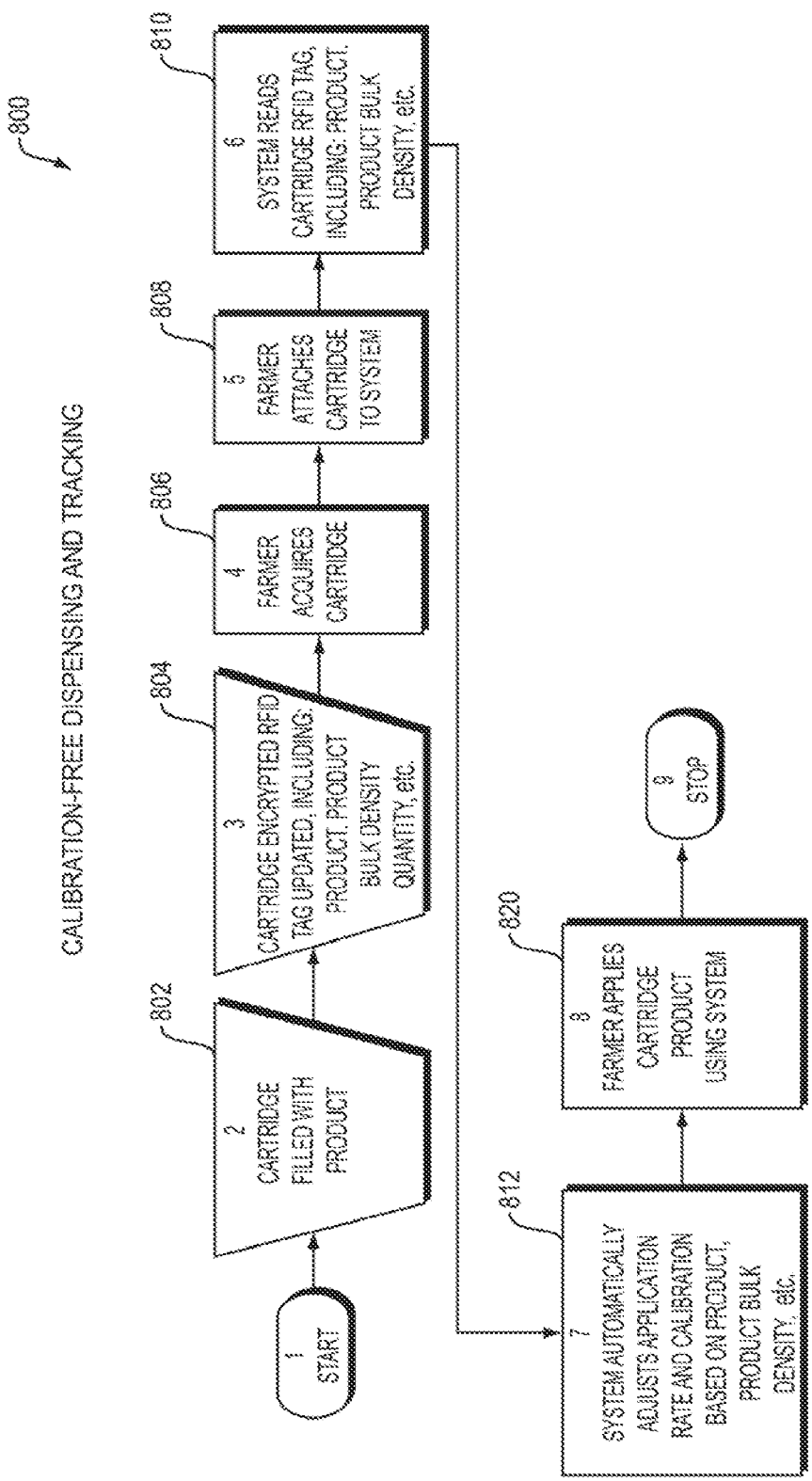
FIG. 8 is a dataflow diagram of a method for automatically recalibrating a meter coupled to the tagged cartridge of FIG. 1 according to one embodiment of the present invention.

More specifically, referring now to FIG. 8, a dataflow diagram is shown of a method 800 for automatically recalibrating a meter (such as any of the meters 306a-h) according to one embodiment of the present invention. Although the method 800 of FIG. 8 is described herein as being applied to the meter 306a, the method 800 may be applied to any meter(s).

The meter recalibration method 800 includes the cartridge 102 being filled with the product 106 (FIG. 8, operation 802), the cartridge tag 108 being updated with product information (FIG. 8, operation 804), the farmer acquiring the cartridge 102 (FIG. 8, operation 806), the farmer attaching the cartridge 102 to the product dispensing assembly 302 (FIG. 8, operation 808), and the tag reader 310 reading some or all of the data from the tag 108 in the cartridge 102 (FIG. 8, operation 810). Operations 802-810 in the method 800 of FIG. 8 may be performed in the same or similar way as operations 802-810 in the method 200 of FIG. 2, and therefore are not described in detail herein.

Assume for purposes of example that the cartridge 102 is inserted into the receptacle 304a and thereby coupled to the meter 306a. The method 800 automatically adjusts the application rate and/or calibration of the meter 306a based on the type and/or bulk density of the product 106 that is in the cartridge 102 (FIG. 8, operation 812). Any reference herein to adjusting the application rate and calibration of the meter 306a should be understood to include only adjusting the application rate, only adjusting the calibration, or adjusting both the application rate and the calibration of the meter 306a.

The product tag 108 may, for example, contain product bulk density data 128 representing the bulk density of the product 106 that is in the cartridge 102. The bulk density data 128 may, for example, be written to the tag 108 at or around the time at which the cartridge 102 is filled with the product 106, such as in the filling operation 802 of the method 800 of FIG. 8, or the refilling operation 424 of the method 400 of FIG. 4. The method 800 may read the bulk density data 128 from the tag 108 and automatically adjust the application rate and calibration of the meter 306a based, in whole or in part, on the bulk density represented by the bulk density data 128. Similarly, the method 800 may read the product type data 120 from the tag 108 and automatically adjust the application rate and calibration of the meter 306a based, in whole or in part, on the product type represented by the product type data 120.

The method 800 may, for example, have access to a plurality of algorithms, each of which corresponds to a particular product type, bulk density, or combination of product type and bulk density. The method 800 may:
  identify the product type of the product 106, select the algorithm corresponding to that product type, and automatically adjust the application rate and calibration of the meter 306a using the selected algorithm;
  identify the bulk density of the product, select the algorithm corresponding to that bulk density, and automatically adjust the application rate and calibration of the meter 306 using the selected algorithm; or
  identify the product type and bulk density of the product 106, select the algorithm corresponding to that product type-bulk density combination, and automatically adjust the application rate and calibration of the meter using the selected algorithm.

Embodiments of the present invention may be used to aggregate a variety of data from the cartridge 102 and from a plurality of cartridges, including both the cartridge 102 and other cartridges (not shown). For example, referring to FIG. 9, a flowchart is shown of a method 900 for aggregating information from a plurality of cartridges, including the cartridge 102, according to one embodiment of the present invention.

Figure 9:
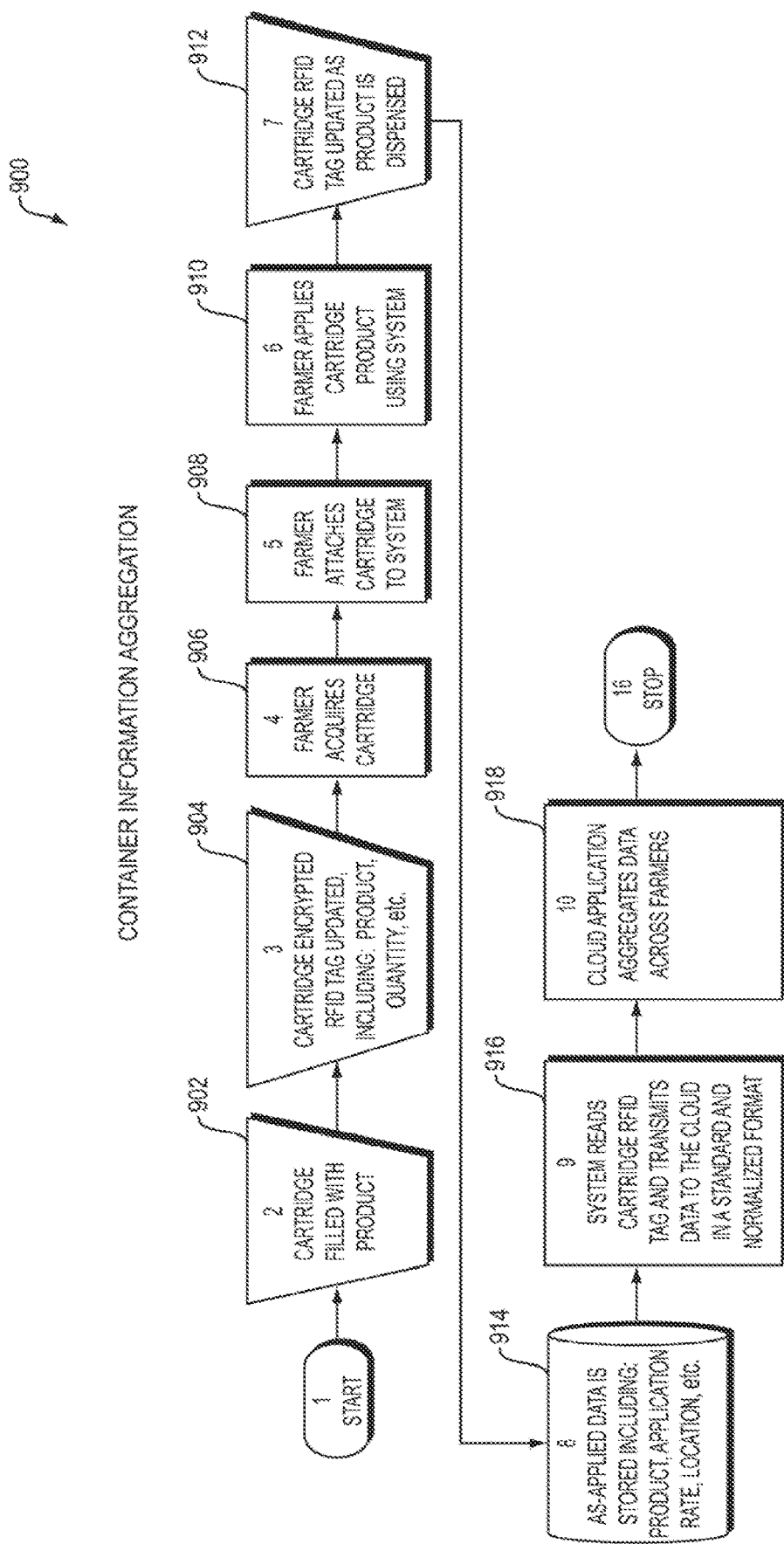
FIG. 9 is a flowchart of a method for aggregating information from a plurality of cartridges according to one embodiment of the present invention.

The cartridge data aggregation method 900 includes the cartridge 102 being filled with the product 106 (FIG. 9, operation 902), the cartridge tag 108 being updated with product information (FIG. 9, operation 904), the farmer acquiring the cartridge 102 (FIG. 9, operation 906), and the farmer attaching the cartridge 102 to the product dispensing assembly 302, FIG. 3 (FIG. 9, operation 908). Operations 902-908 in the method 900 of FIG. 9 may be performed in the same or similar way as operations 202-208 in the method 200 of FIG. 2, and therefore are not described in detail herein.

As the cartridge 102 dispenses its product (via corresponding meter 306a) (FIG. 9, operation 910), the system 300 uses product measurement module 322 to measure the amount of product 106 being dispensed from the cartridge 102, as described above in connection with FIGS. 2-3. Furthermore, the method 900 updates the product quantity data 118 on the tag 108 to reflect the amount of product 106 dispensed and/or the remaining amount of product 106 in the product storage unit 104 (FIG. 9, operation 912), as described above in connection with FIGS. 2-3.

The method 900 updates various as-applied data 124 in the tag 108 in addition to the product quantity data 118 as the product 106 is being dispensed from the cartridge 102 (FIG. 9, operation 914), as described above in connection with FIGS. 2-3. The method 900 may transmit data from the tag 108 to the server 332 (FIG. 9, operation 916) and/or to at least one I/O Device 336, as described above in connection with FIGS. 2-3.

The method 900 may also be applied to one or more cartridges in addition to the cartridge 102. For example, operations 902-916 may be applied to such cartridges, and thereby to monitor, store, and transmit data (such as product quantity data and as-applied data) from such cartridges to the server 332 in the manner described above in connection with the cartridge 102. The server 332 may, therefore, receive any such data not only from the cartridge 102 but from one or more additional cartridges over time. The server 332 may store any such data in the measurement data 334. As a result, the measurement data 334 may include data received from a plurality of cartridges over time.

The server 332 may aggregate the data received from the plurality of containers in any of a variety of ways (FIG. 9, operation 918). For example, the server 332 may aggregate some or all data received from a particular cartridge (such as the cartridge 102), such as by creating an as-applied map based on data received from the particular cartridge, generating statistics (such as sums, averages, and standard deviations) based on data received from the particular cartridge, and storing the cartridge ID of the particular cartridge (or other unique identifier) in association with the data received from the particular cartridge in order to identify all such data as having been received from the same cartridge.

As another example, the server 332 may aggregate data from two or more cartridges. For example, the server 332 may generate statistics (such as sums, averages, and standard deviations) based on data received from a plurality of cartridges. As another example, the server 332 may generate a combined as-applied map for a specific field, incorporating as-applied data from a plurality of cartridges, such as all cartridges utilized by a particular agricultural dispensing apparatus at the specific field.

Embodiments of the present invention may facilitate such data aggregation in any of a variety of ways. For example, the tags on the plurality of cartridges may store their data in the same, or otherwise consistent, data format. For example, the same types of data (e.g., product type and product quantity) may be stored in the same format (e.g., using the same field names) on all of the tags. As a result, when the server 332 receives data from the plurality of tags, the server 332 may easily aggregate such data, because the server 332 may easily identify data of the same type (e.g., product quantity) from all of the cartridges. This enables the method 900 to aggregate data across cartridges, product dispensing assemblies, and farmers, without requiring the farms to engage in manual (and often error-prone and inconsistent) data entry and reporting. This is a significant advantage over existing systems, in which cartridge data are stored in inconsistent formats and must be entered and reported manually by farmers, often resulting in errors, delays, and failure to report data.

It is to be understood that although the invention has been described above and illustrated in the drawings in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Although specific features of the present invention are shown in some drawings and not in others, this is for convenience only, as each feature may be combined with any or all of the other features in accordance with the invention. Substitutions of elements from one described embodiment to another are also fully intended and contemplated. It is also to be understood that the drawings are not necessarily drawn to scale, but that they are merely conceptual in nature.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically track the amount of product dispensed by a cartridge onto a field, automatically update data in an electronic memory representing such amounts of dispensed product, and automatically and wirelessly transmit such data to a server over a digital electronic network for storage and processing. Such features can only be performed by computers and other machines and cannot be performed manually or mentally by humans.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium to authenticate and track product use by a user, the method comprising:
    (A) entering specific user identity data, cartridge identity data and product identity data into memory associated with at least one cartridge;
    (B) when the cartridge is in proximity to dispensing equipment operated for the benefit of a current user, (i) reading the cartridge identity data, the specific user identity data and the product identity data from the cartridge and (ii) reading current user identity data in proximity to the dispensing equipment;
    (C) determining whether the cartridge is authorized for use by the current user with the product based on the cartridge identity data, the specific user identity data, the current user identity data, and the product identity data;
    (D) if the cartridge is determined not to be authorized for use with the product by the current user, then prohibiting the cartridge from dispensing the product; and
    (E) if the cartridge is determined to be authorized for use with the product by the current user, then permitting the cartridge to dispense the product.

2. The method of claim 1 further including detecting a change in use of the product stored in the cartridge and generating product use data representing the change in use of the product stored in the cartridge.

3. The method of claim 2 further including repeatedly updating product use data in the memory associated with the cartridge during repeated intervals to reflect the change in the use of the product stored in the cartridge during each interval.

4. The method of claim 3 further including processing the cartridge after dispensing by reading updated product use data from the memory associated with the cartridge and then adding an amount of product to the cartridge based on the updated product use data.

5. The method of claim 4 further including (i) entering vendor ID data into the memory associated with the cartridge prior to dispensing of product from the cartridge, (ii) reading the vendor ID data during processing of the cartridge after dispensing, and (iii) prohibiting adding product to the cartridge until the vendor ID data is determined to be authorized for that product in that cartridge.

6. The method of claim 2 wherein the product use data includes at least one of product quantity, rate of dispensing, time of dispensing, linear length of treatment by dispensing, location of dispensing, and area of treatment by dispensing.

7. The method of claim 2 further including generating an invoice for the specific user based on the product use data.

8. The method of claim 1 wherein the memory associated with the cartridge is part of an RFID tag.

9. The method of claim 1 wherein the current user identity data is read from a user identification source associated with the dispensing equipment.

10. The method of claim 1 wherein the current user identity data includes an authorization code to enable dispensing by the dispensing equipment.

11. The method of claim 1 further including tracking each entity that takes possession of the cartridge, and updating the memory associated with the cartridge with entity possession data.

12. The method of claim 1 further including designating a cartridge as the cartridge to be used by or on behalf of the specific user for specific product.

13. The method of claim 1 further including repeatedly detecting, at least during dispensing of the product, changes in geographic location of the cartridge, and repeatedly entering and updating geographic information for a plurality of geographic locations with as-applied product data at those geographic locations into the memory associated with the cartridge.

14. The method of claim 13 further including generating an as-applied map to record as-applied quantities of product dispensed at the geographic locations at a target area.

15. The method of claim 14 further including comparing the as-applied map to a prescriptive map to generate a difference map indicating at least differences greater than a selected error amount between prescribed information in the prescriptive map and as-applied information in the as-applied map relating to quantities and type of product actually dispensed at the geographic locations at the target area.

16. The method of claim 13 further including comparing the as-applied product data to prescriptive application data to generate an error message for differences greater than a selected error amount between prescribed information and as-applied information relating to quantities and type of product actually dispensed at the geographic locations at a target area.

17. The method of claim 13 further including generating an invoice for the specific user based on the as-applied product data.

18. A non-transitory computer-readable medium storing computer program instructions to authenticate and track product use by a user, the instructions comprising:
    (A) entering specific user identity data, cartridge identity data and product identity data into memory associated with at least one cartridge;
    (B) when the cartridge is in proximity to dispensing equipment operated for the benefit of a current user, (i) reading the cartridge identity data, the specific user identity data and the product identity data from the cartridge and (ii) reading current user identity data in proximity to the dispensing equipment;
    (C) determining whether the cartridge is authorized for use by the current user with the product based on the cartridge identity data, the specific user identity data, the current user identity data, and the product identity data;
    (D) if the cartridge is determined not to be authorized for use with the product by the current user, then prohibiting the cartridge from dispensing the product; and
    (E) if the cartridge is determined to be authorized for use with the product by the current user, then permitting the cartridge to dispense the product.

19. A system to authenticate and track use by a user of product suitable for at least one of agricultural use and horticultural use, the system comprising:
    at least one computer processor;
    at least one non-transitory computer-readable medium operatively connected to the computer processor;

at least one cartridge suitable to carry product suitable for at least one of agricultural use and horticultural use while isolating the product from a surrounding environment; and memory physically connected to the cartridge;

wherein, responsive to execution of program instructions accessible to the at least one processor, the at least one processor is configured to:

(A) enter specific user identity data, cartridge identity data and product identity data into memory associated with the at least one cartridge;

(B) when the cartridge is in proximity to dispensing equipment operated for the benefit of a current user, (i) read the cartridge identity data, the specific user identity data and the product identity data from the cartridge and (ii) read current user identity data in proximity to the dispensing equipment;

(C) determine whether the cartridge is authorized for use by the current user with the product based on the cartridge identity data, the specific user identity data, the current user identity data, and the product identity data;

(D) if the cartridge is determined not to be authorized for use with the product by the current user, then prohibiting the cartridge from dispensing the product; and (E) if the cartridge is determined to be authorized for use with the product by the current user, then permitting the cartridge to dispense the product.

20. The system of claim 19 wherein the memory physically connected to the at least one cartridge is part of a RFID tag carried by the cartridge.

21. The system of claim 19 further including a plurality of cartridges, each cartridge having memory physically connected to that cartridge with unique cartridge identity data for that cartridge.

22. A method performed by at least one computer processor executing computer program instructions stored on at least one non-transitory computer-readable medium to authenticate and track product use by a user, the method comprising:

(A) entering specific user identity data, cartridge identity data and product identity data into memory associated with at least one cartridge;

(B) when the cartridge is in proximity to dispensing equipment operated for the benefit of a current user, (i) reading the cartridge identity data, the specific user identity data and the product identity data from the cartridge and (ii) reading current user identity data in proximity to the dispensing equipment;

(C) detecting a change in use of the product stored in the cartridge; and (D) generating product use data representing the change in use of the product stored in the cartridge, including repeatedly updating product use data in the memory associated with the cartridge during repeated intervals to reflect the change in the use of the product stored in the cartridge during each interval.

23. The method of claim 22 further including processing the cartridge after dispensing by reading updated product use data from the memory associated with the cartridge and then adding an amount of product to the cartridge based on the updated product use data.

24. The method of claim 23 further including (i) entering vendor ID data into the memory associated with the cartridge prior to dispensing of product from the cartridge, (ii) reading the vendor ID data during processing of the cartridge after dispensing, and (iii) prohibiting adding product to the cartridge until the vendor ID data is determined to be authorized for that product in that cartridge.

25. The method of claim 22 further including repeatedly detecting, at least during dispensing of the product, changes in geographic location of the cartridge, and repeatedly entering and updating geographic information for a plurality of geographic locations with as-applied product data at those geographic locations into the memory associated with the cartridge.

26. The method of claim 25 further including generating an as-applied map to record as-applied quantities of product dispensed at the geographic locations at a target area.

27. The method of claim 26 further including comparing the as-applied map to a prescriptive map to generate a difference map indicating at least differences greater than a selected error amount between prescribed information in the prescriptive map and as-applied information in the as-applied map relating to quantities and type of product actually dispensed at the geographic locations at the target area.

28. The method of claim 25 further including comparing the as-applied product data to prescriptive application data to generate an error message for differences greater than a selected error amount between prescribed information and as-applied information relating to quantities and type of product actually dispensed at the sequential geographic locations at a target area.

29. The method of claim 25 further including generating an invoice for the specific user based on the as-applied product data.

30. The method of claim 22 wherein the product use data is generated in response to detecting a change in use of the product stored in the cartridge.

* * * * *

UNITED STATES PATENT AND TRADEMARK OFFICE
CERTIFICATE OF CORRECTION

PATENT NO. : 10,694,655 B2
APPLICATION NO. : 15/981289
DATED : June 30, 2020
INVENTOR(S) : Wintemute et al.

Page 1 of 1

It is certified that error appears in the above-identified patent and that said Letters Patent is hereby corrected as shown below:

In the Specification

In Column 12, Lines 33-34, delete "planter 122 having" and insert -- planter having --, therefor.

In Column 15, Line 41, delete "cartridge in the container 102" and insert -- cartridge 102 --, therefor.

In Column 18, Line 50, delete "(operation 404)," and insert -- (FIG. 4 operation 404), --, therefor.

Signed and Sealed this
Eleventh Day of August, 2020

Andrei Iancu
*Director of the United States Patent and Trademark Office*